United States Patent [19]

Caizergues et al.

[11] Patent Number: 4,491,944
[45] Date of Patent: Jan. 1, 1985

[54] DISTRIBUTED CONTROL TIME DIVISION EXCHANGE

[75] Inventors: Paul Caizergues, Jouy en Josas; Maurice Martin, Paris, both of France

[73] Assignee: Compagnie Industrielle des Telecommunications Cit-Alcatel, Paris, France

[21] Appl. No.: 365,692

[22] Filed: Apr. 5, 1982

[30] Foreign Application Priority Data

Apr. 3, 1981 [FR] France .............................. 81 06807

[51] Int. Cl.³ .......................................... H04Q 11/04
[52] U.S. Cl. ..................................... 370/58; 370/110.1
[58] Field of Search ................... 370/58, 110.1, 92, 94

[56] References Cited

U.S. PATENT DOCUMENTS

| 4,107,480 | 8/1978 | Schlichte | 370/58 |
| 4,201,891 | 5/1980 | Lawrence et al. | 370/58 |
| 4,317,193 | 2/1982 | Joel | 370/58 |
| 4,356,563 | 10/1982 | Viale | 370/58 |

FOREIGN PATENT DOCUMENTS

| 2016867 | 9/1979 | United Kingdom . |
| 2022364 | 12/1979 | United Kingdom . |

OTHER PUBLICATIONS

International Switching Symposium, May 11, 1979, Paris, F. Anceau et al., "Project of an Architecture for the Command of an Electronic Switching System", pp. 608-614.

GEC Journal of Science and Technology, vol. 45, No. 3, 1979, J. C. D. Nissen et al., "A Fault-Tolerant Multimicroprocessor for Telecommunications and General Applications", pp. 116-122.

International Conference on Communications, Jun. 1979, Boston, U.S.A., J. Okuda et al., "New Architecture for Public Digital Telephone Switching System", pp. 12.2.1 to 12.2.5.

Primary Examiner—Douglas W. Olms
Attorney, Agent, or Firm—Sughrue, Mion, Zinn, Macpeak & Seas

[57] ABSTRACT

A time division exchange controlled by a plurality of control units (UC, UCP), terminal units (UT) and markers (MQ). The control units are connected to each other and to the markers by a data interchange network (RIT) of a type which provides point-to-point serial connections. The network is duplicated and operates using a semaphore procedure. Access to the network is controlled by a duplicated controller (DR). Two-way multiplex links (LX) are provided over switched paths which could be used for voice or data switching. They are also used using a semaphore procedure and serve to provide connections between the control units and the terminal units. These connections are established via the exchange switching network. The invention is applicable to telephone switching or to data switching at subscriber or trunk level.

10 Claims, 14 Drawing Figures

DISTRIBUTED CONTROL TIME DIVISION EXCHANGE

The invention relates to a time division exchange with distributed control, usable in particular for switching telephone lines or circuits or for switching data transmission lines.

BACKGROUND OF THE INVENTION

When powerful processor machines with a very low failure rate were first introduced into telephone exchanges, more than ten years ago, their introduction went hand-in-hand with a centralization of substantially all control functions. Such processors could process telephone events in real time, and further they could be programmed to provide a rich variety of new services and facilities.

However, distributed control systems are preferable from the points of view of exchange flexibility and modularity, and new factors which have occurred over the last few years are now facilitating the design of time division exchanges which rely on distributed control. The main factors are as follows:

The development of powerful microprocessors together with their associated LSI circuitry and software tools for developing programs therefor;

The possibility of using the switching network to switch paths for control signals in addition to speech paths over digitally multiplexed links; and The exchange can switch both speech paths and computer services by means of appropriate microprocessor controlled terminals.

In known control systems using a plurality of processors, the processors are often connected to one or more common bus lines, which are also connected to various common resources such as peripheral memories.

These arrangements are difficult to manage and they are vulnerable. Further, the number of processors that can be accommodated in a single set is fairly limited. Such a structure is not appropriate for a telephone exchange driven by a pool of microprocessors and equipped with microprocessor controlled terminal units, since such an exchange could easily require thirty or so processors connected to a hundred or so terminal units.

Preferred embodiments of the present invention provide a telephone exchange driven by a plurality of processors which do not share a common bus, which do not have direct access to common resources, but which communicate with each other by a system of sending messages.

Such exchanges can be highly modular in design and the equipment can be provided in a carefully designed redundant manner, whereby faults affecting only a small part of the exchange can be dealt with automatically, so that faults requiring emergency human intervention are extremely rare.

SUMMARY OF THE INVENTION

The present invention provides a time division exchange comprising: a switching network organized as a set of independent marker driven planes; a plurality of processor controlled terminal units connected to the switching network via multiplex links; a set of control units constituted by interchangeable processors provided with exchange control software; and a plurality of peripheral equipment driving processors: wherein said processors and said markers are connected to each other by a data interchange network providing serial point-to-point connections using a semaphore procedure, and with access to the network being controlled by a network controller, and wherein said processors are connected to the switching network via multiplex links whose time slots are likewise used according to a semaphore procedure to control the processors of the terminal units, the controlling software being split up into logical machines which are independent of the physical processor in which they happen to be loaded at any given time.

BRIEF DESCRIPTION OF THE DRAWINGS

An embodiment of the invention is described by way of example with reference to the accompanying drawings, in which.

DETAILED DESCRIPTION OF THE INVENTION

Figure 1:
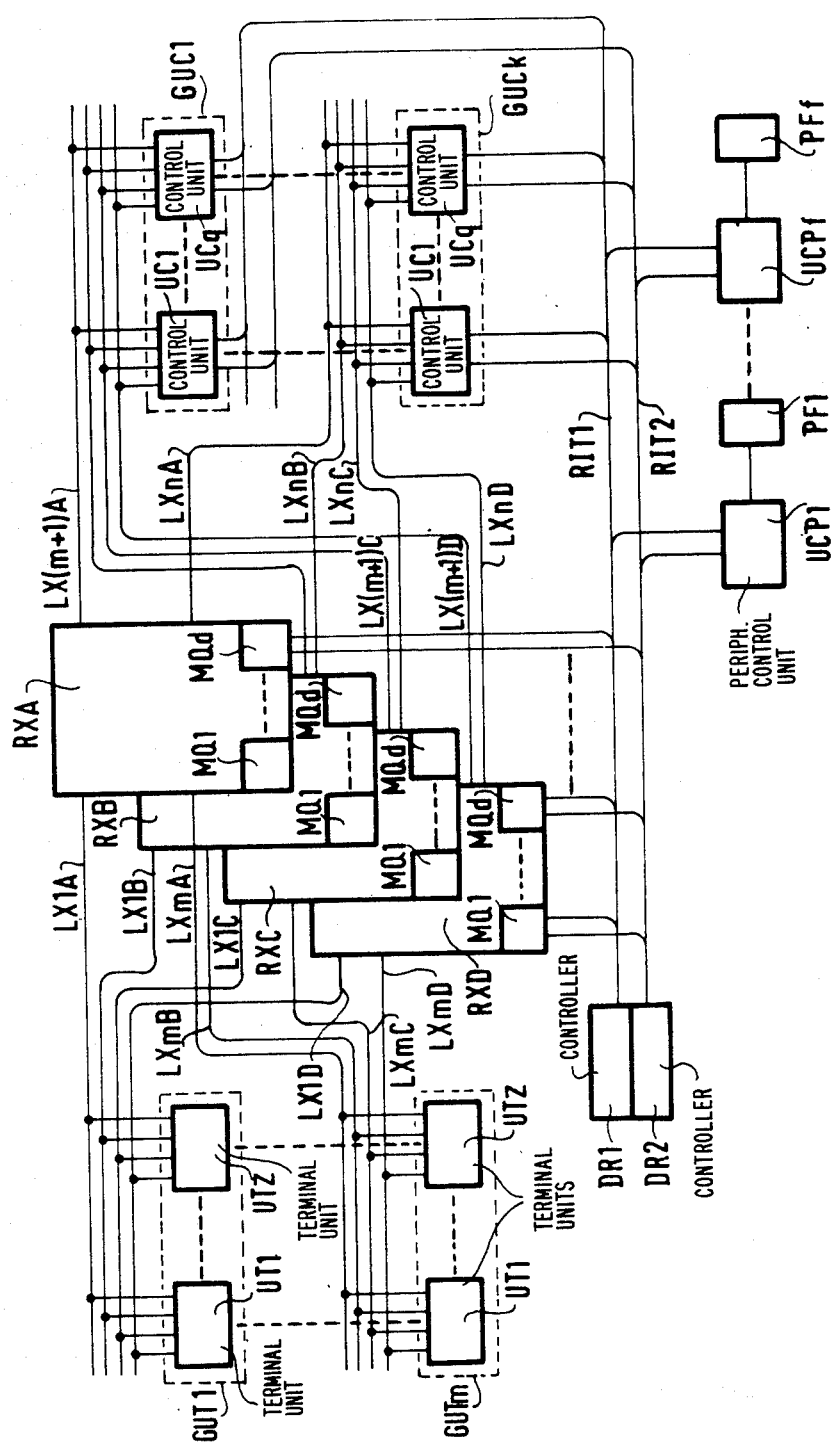
FIG. 1 is an overall block diagram of an exchange in accordance with the invention and having a time division switching network.

The time division exchange shown in simplified manner in FIG. 1 comprises three main portions:

(1) m groups of terminal units GUT1 to GUTm comprising subscriber terminals, analog and digital circuits, and auxiliary signalling terminals for applying tones or recorded announcements to subscriber lines, for testing subscriber lines and circuits, together with conference circuits, etc. . . .

(2) A central switching network having a single stage of switching. The network is organized in independent planes, eg. four planes RXA to RXD. The figures given in this description are merely by way of example and to simplify the drawings.

(3) Exchange control means of distributed architecture constituted by k groups GUC1 to GUCk of identical control units UC, e.g., microprocessors. The control units per se UC1 to UCq are interchangeable. The control means also includes control units UCP1 to UCPf for controlling groups of peripherals PF1 to PFf. These control units may be identical to the preceding control units, but they cannot be totally interchangeable on account of their physical connections with the peripherals.

The above three portions of the exchange are interconnected as follows:

(1) The terminal units UT (UT1 to UTz) are connected to each of the planes RXA to RXD of the switching network via multiplex links LX such as LX1A to LXmD each of which comprises 32 time slots which are 8 bits wide and operating at 2 M bits/sec in each transmission direction. The terminal units UT of each group are connected in parallel to the same multiplex links LX.

(2) The control units UC1 to UCq are likewise connected to the switching network via multiplex links LX(m+1)A to LXnD, with one multiplex link LX per group GUC to each plane of the network. Messages interchanged between control units and terminal units are transmitted via time slots in the links LS which are connected by the switching network in a semi-permanent and reconfigurable manner. Data transmission channels are thus provided having a data rate of 64 K bits/sec which are used according to the so-called HDLC procedure defined in the CCITT's standard ISO.

(3) The control links UC and UCP are interconnected by point-to-point links RIT1 and RIT2 which are doubled up for safety reasons. They are serial links which likewise use the HDLC procedure. Access to these links is managed by a duplicated controller DR1, DR2 which authorizes transmission thereover and which supervises the durations of such transmissions.

The link comprises five pairs of wires going to each station connected thereto, for the purposes of calling, authorization, clock transmission, signal transmission and signal reception.

Connections between the control units UC and the terminal units UT are established via the switching network by means of semi-permanent connections between PCM time slots.

The central switching network RXA to RXD is controlled by markers MQ1 to MQd which are controlled by the control units via the said links RIT1 and RIT2.

All the above-mentioned units: UT, UC, UCP and MQ are provided with respective send/receive circuits for interchanging HDLC type messages, eg. an MC 6854 type circuit manufactured by MOTOROLA or an 8273 circuit manufactured by INTEL.

It is necessary to provide a switching stage in the terminal units UT in order to connect any terminal to any time slot in any of the multiplex links LX serving said terminal unit.

Figure 2:
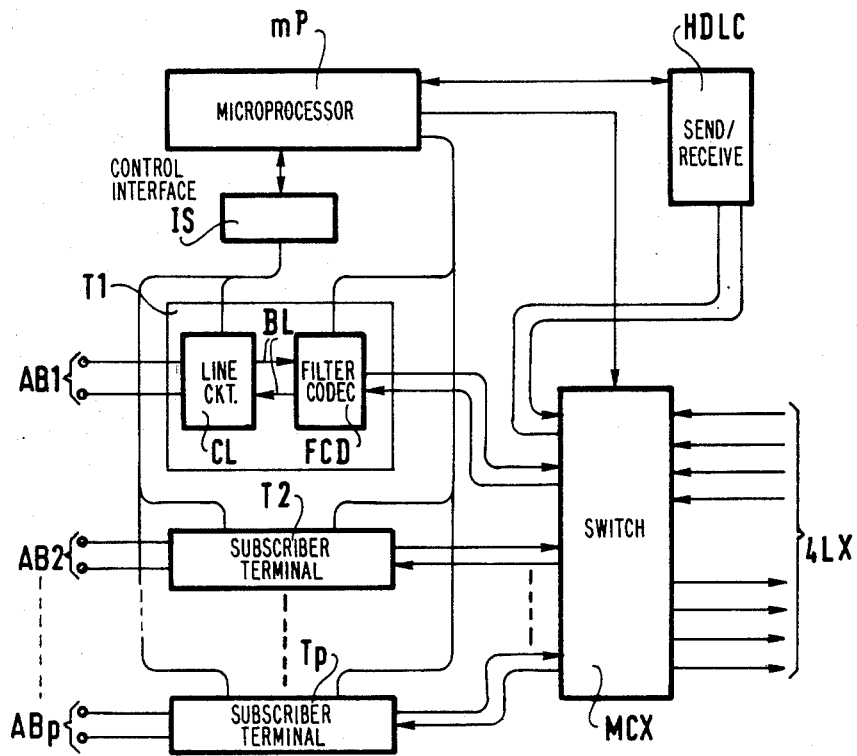
FIG. 2 is a block diagram of a subscriber terminal unit.

An example of a subscriber terminal unit is shown in FIG. 2. Each subscriber terminal T1 to Tp is constituted by a line circuit CL connected to a respective subscriber AB1 to ABp and comprising power supply means, protector means, loop supervisory means, ringing current injector means, and a filter and codec circuit FCD providing an interface between analog and digital signals.

The terminal unit UT is controlled by a microprocessor mP connected to the four multiplex links LX via an HDLC type send/receive circuit. The switching stage in this example is a space type matrix MCX.

Time switching is performed by the filtering and codec circuits FCD by synchronizing to a chosen time slot under control of the microprocessor. The microprocessor also controls the line circuits CL via a supervisory and control interface IS.

Figure 3:
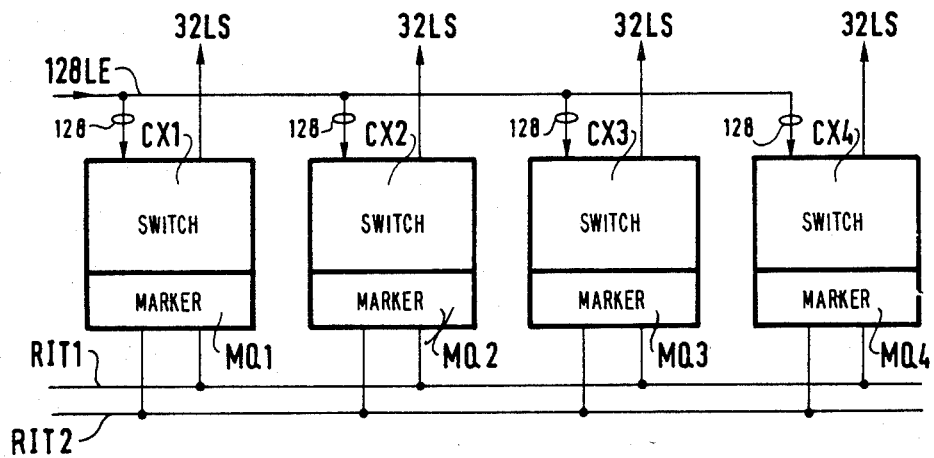
FIG. 3 is a general diagram of a single plane in the switching network of the exchange.

The central switching network is shown in more detail in FIG. 3. It comprises a single switching stage and is organized in four independent planes. Each plane of the switching network has a capacity of 128 two-way multiplex links LX, i.e. it can connect any time slot from any one of 128 inlet links LE to any time slot in one of 128 outlet links LS.

One plane of the switching network comprises four switches CX1 to CX4, each of which is provided with a respective marker MQ1 to MQ4, and each of which has a capacity of 128 inlet links LE and 32 outlet links LS. The inlet links LE are thus multipled over the four switches of any one plane.

Figure 4:
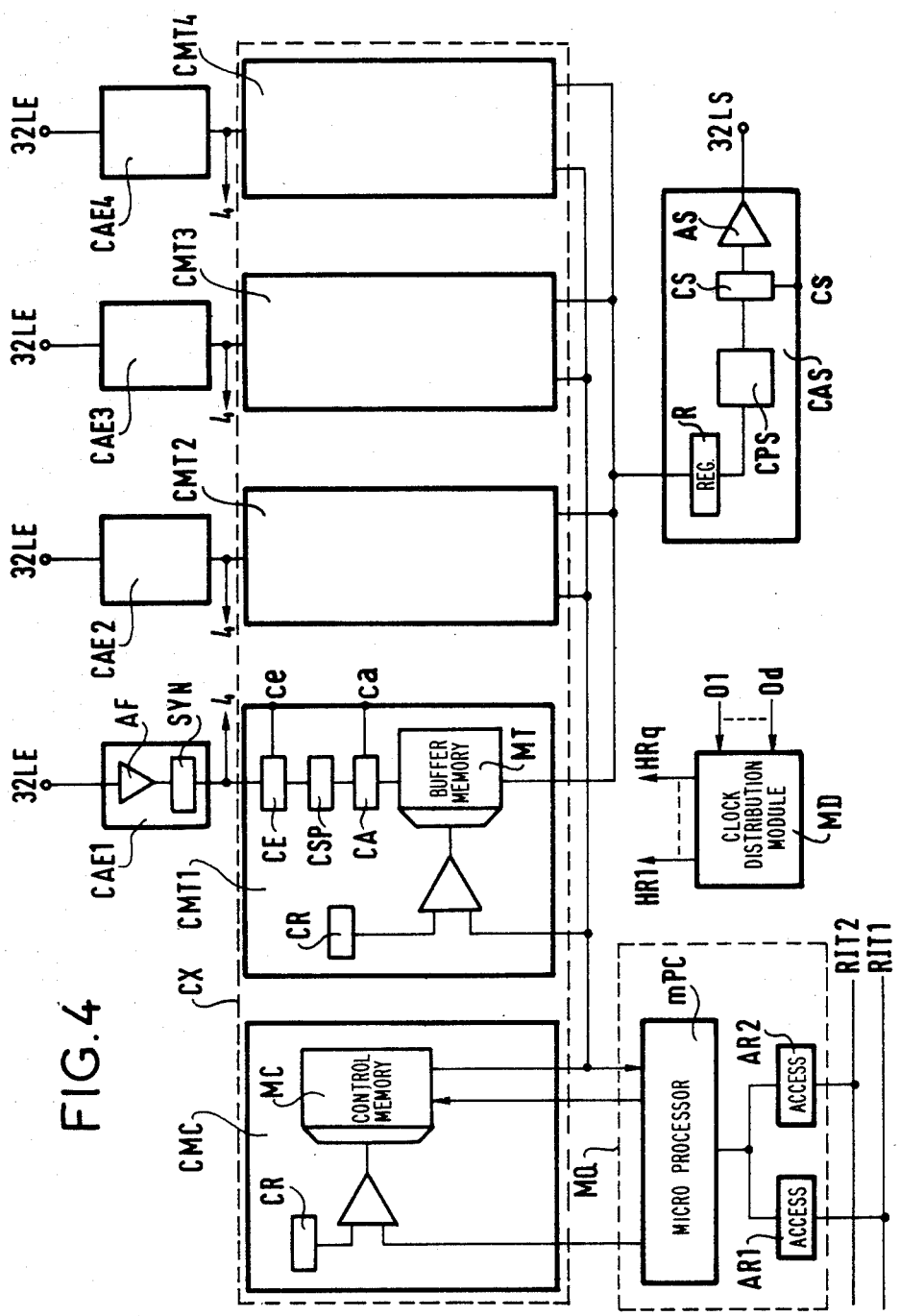
FIG. 4 is a general diagram of a time division switch.

The structure of a switch CX is shown in FIG. 4. The 128 inlet links LE are distributed over four inlet amplifier circuits CAE1 to CAE4, each of which comprises 32 amplifiers AF and a synchronizing circuit SYN. The inlet amplifier circuits CAE are common to the four switches CX of the same plane and each of them serves 32 of the 128 inlet links LE connected to said plane. Each inlet amplifier circuit CAE is connected to one of four buffer memory circuits CMT1 to CMT4 in each switch CX. These buffer memory circuits constitute square switching matrices and each comprises in succession: an inlet sampling and control circuit CE, a serial to parallel converter circuit CSP, and an access circuit CA to a buffer memory MT. The access circuit CA also provides for injecting samples to perform so-called "active" checking of the switching network.

The buffer memory MT comprises 1024 8 bit words, i.e. one word for each time slot in the 32 inlet links LE connectable thereto. Data is written to the memory and read therefrom at a rate of 8 MHz, i.e. at a rate approaching the maximum usable with the TTL technology used.

"Downstream control" addressing is used, i.e. write addressing is provided by a counter CR while read addressing is provided by a control circuit CMC under the control of the marker MQ. A control memory MC provides the read addresses for use in the memories MT of the four buffer memory circuits CMT1 to CMT4. The control memory MC is itself cyclically addressed for reading, and is addressed by the marker for writing in order to store each new connection or disconnection.

The marker MQ comprises a microprocessor mPC which is connected to the links RIT1 and RIT2 via access circuits AR1 and AR2 described below.

The outlets of the buffer memories MT of the four buffer memory circuits CMT1 to CMT4 of a given plane are connected in parallel to an outlet amplifier circuit CAS comprising buffer registers R connected to a parallel/serial conversion circuit CPS which is itself connected to an outlet sampling circuit CS serving a group of 32 amplifiers AS each of which is connected to a different one of the outlets links LS.

A set of clock signals HR1 to HRq required to make the switch operate is provided by a clock signal distribution module MD which is itself driven by oscillators O1 to Od (not shown).

The network modularity is as follows:

(1) For up to 32 groups G of terminal units GUT, or control units GUC, it is sufficient to equip one switch with a single buffer memory circuit CMT.

(2) For 33 to 64 groups, two switches each equipped with two buffer memories are required.

(3) For 65 to 96 groups, three switches each equipped with three buffer memories are required.

(4) For 97 to 128 groups, four switches fully equipped with four buffer memories are required.

The following description relates to one particular embodiment of the main circuits constituting the switches.

Figure 5A:
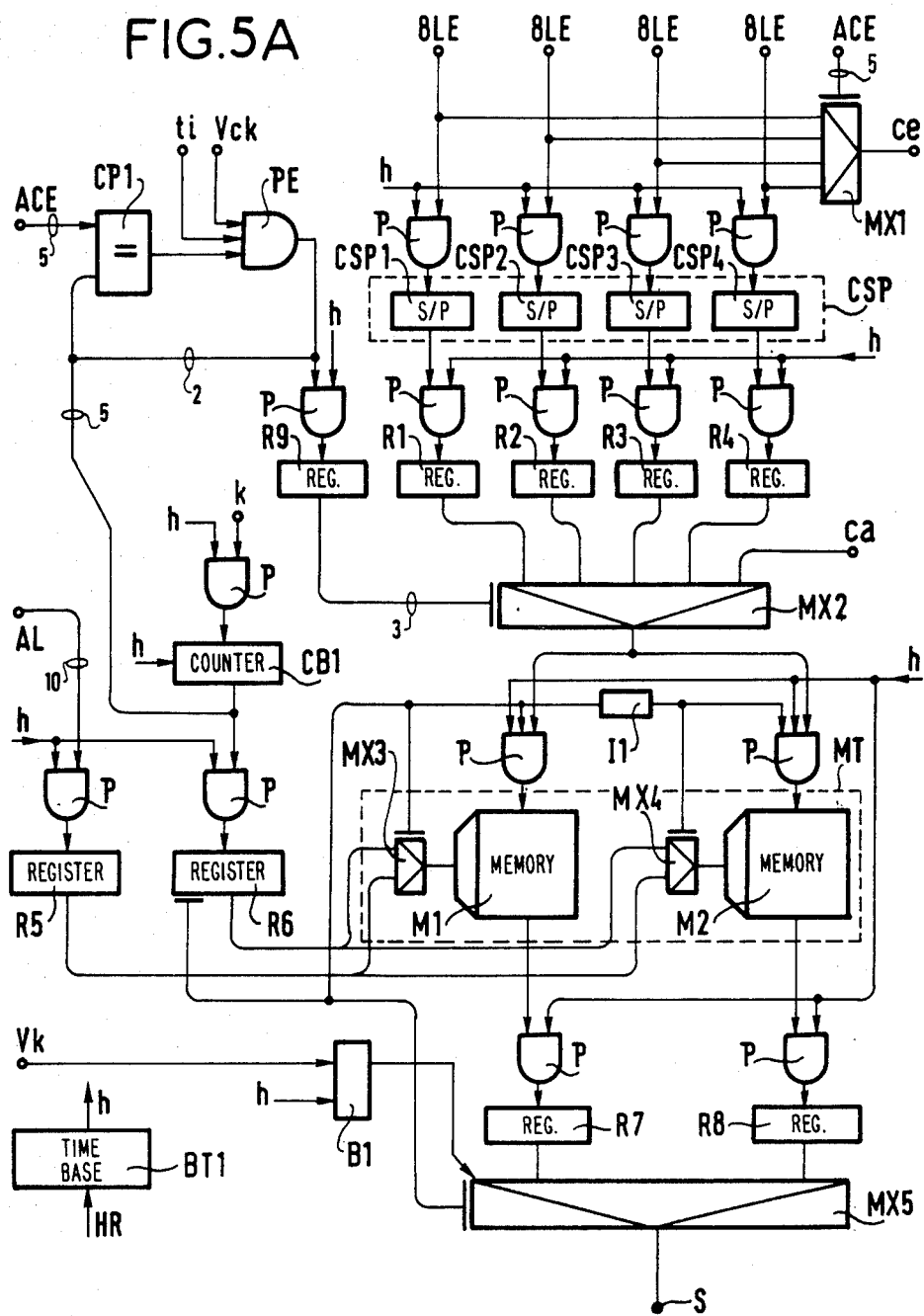
FIG. 5 is in two parts, 5A and 5B which constitute a single circuit diagram of switching circuits shown in FIG. 6; the two halves are joined at a point S.
Figure 5B:
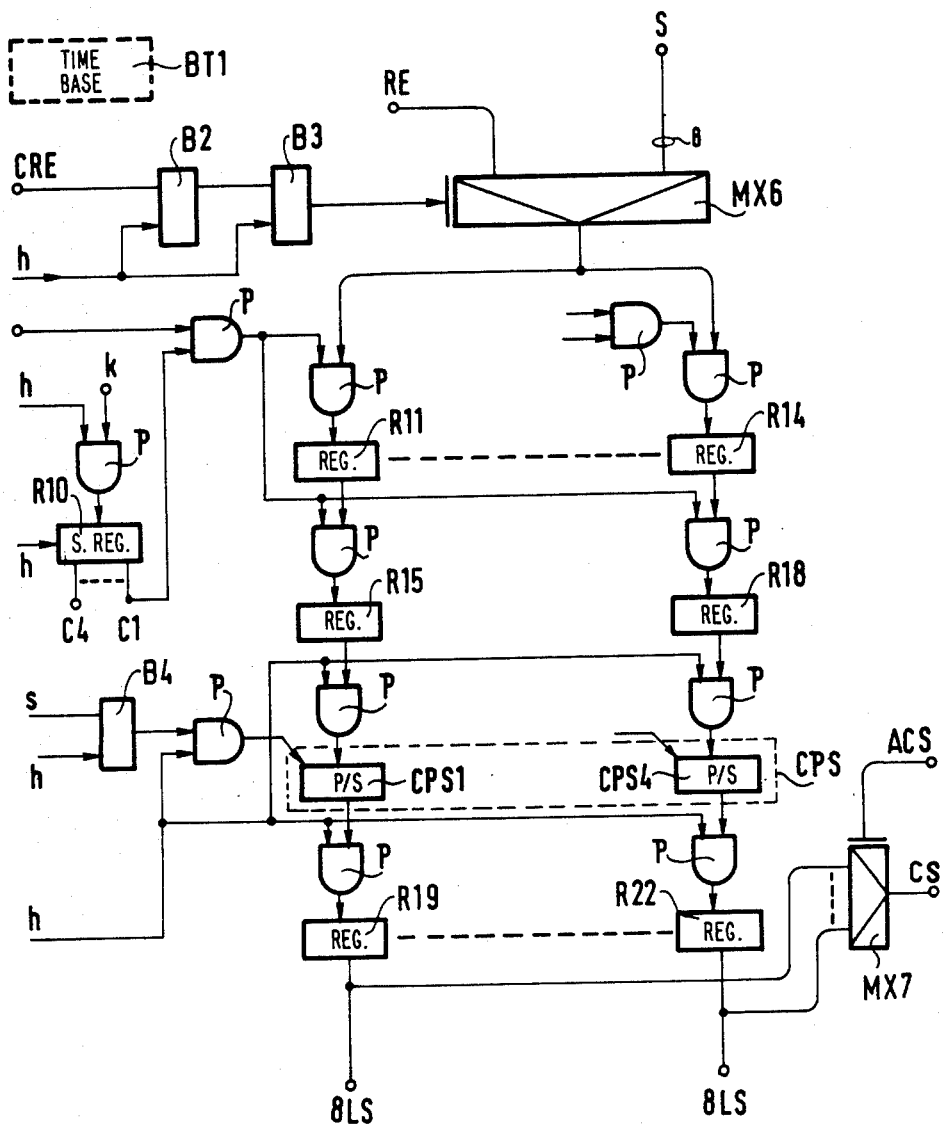

The buffer memory circuits CMT and the outlet amplifier circuits CAS are shown in FIGS. 5A and 5B, respectively. Clock and synchronizing signals are distributed via a time base circuit BT1 which is itself synchronized with the signal distribution module MD of the switch (FIG. 4). The time base circuit BT1 delivers clock signals "h" which are not described in detail since they are well known to person skilled in the art, and they can be derived from the manner in which the circuits operate as described below.

A signal ce is sampled from the 32 inlet links LE of the time switch by means of a multiplexer MX1 having respective inputs connected to the 32 links. The address ACE of the link to be checked is provided by the circuit CMC of the switch CX.

The converter circuit CSP comprises four integrated circuits CSP1 to CSP4 of the MICSPA type (registers for converting PCM encoded samples between serial and parallel modes of transmission). Each of them is connected to eight of the 32 inlet links to the buffer memory circuit CMT via eight gates P. The outlets from the circuits CSP1 to CSP4 are connected to four registers R1 to R4, respectively. Samples are switched to the buffer memory via a multiplexer MX2 having one inlet connected to receive an active test code Ca which may be hard wired.

AND gates, given overall a reference P, are enabled by the time base BT1 to control the inputs to the registers of the conversion circuits CSP, to the buffer memory MT, and in general, various other transfers. Such gates will no longer be referred to specifically in the description, but they can be seen on the drawings.

To enable the buffer memory MT to be used at maximum speed, it is split into two portions M1 and M2, one of which is used in a write mode while the other is being used in a read mode. Read addressing AL is provided by the control memory MC of the switch CX via a register R5 and multiplexers MX3 and MX4. Write addressing is supplied by a counter CB1 counting at a frequency of 8 MHz and arrives via a register R6 and the same multiplexers MX3 and MX4. The counter has twice the necessary capacity (11 bits rather than the 10 required to address 1024 words) in order to alternate between the two buffer memories. The least significant bit directly controls the multiplexer MX3 and the input to the memory M1, and controls the multiplexer MX4 for input to the memory M2 via an inverter I1. The counter CB1 is synchronised by the time base BT1 (by loading the hard wired starting value K).

The outlet from the memories M1 and M2 is applied to an eight bit parallel output S from the buffer memory circuit CMT via registers R7 and R8 and a multiplexer MX5 addressed by the least significant bit of the counter CB2 and controlled by a bistable B1 which receives an enabling signal Vk for enabling access to the outlet circuit CAS associated with a switch CX. The signal Vk (k=1 to 4) is delivered by the control circuit CMC of the switch and serves to select that one of the memory circuits CMT whose buffer memory MT is going to supply the sample to be output at a particular instant by the switch CX.

To inject the active test signal "Ca", the inlet link address ACE supplied by the control circuit CMC is compared by a comparator CP1 with the five most significant bits of the counter CB2. The register R9 for addressing the multiplexer MX2 receives the two most significant bits from the counter CB1 and a bit supplied by an AND gate PE which is connected to receive the output from the comparator CP1, an injection pulse ti supplied by the memory control circuit CMC and synchronized with the time slot in question, and a circuit enable signal Vck (k=1 to 4) supplied by the same control circuit CMC.

At the inlet to the outlet amplification circuit CAS, a multiplexer MX6 selects one of the four outputs S from the buffer memory CMT1 to CMT4 in the switch, or else a hard wired idle code RE which is systematically applied to non-connected outlet links LS. A signal CRE for injecting this code is transmitted by the control circuit CME via synchronizing bistables B2 and B3 to the addressing input of the multiplexer MX6.

The output of multiplexer MX6 provides samples which are applied successively to four registers R11 to R14 under the control of a four bit shift register R10 which receives clock pulses at a frequency of 8 MHz in synchronization with the outlet links LS.

The samples finally pass through intermediate registers R15 to R18, the conversion circuit CPS which is constituted by four MICSPA type circuits CPS1 to CPS4 capable of performing parallel to serial conversions, and four output buffer registers R19 to R22.

The inputs to the circuit CPS1 to CPS4 are enabled by a bistable B4 which is actuated in synchronization with each outlet time slot.

The outlet is checked by taking samples CS via a multiplexer MX7 whose five bit address AC5 is supplied by the control circuit CMC.

Figure 6:
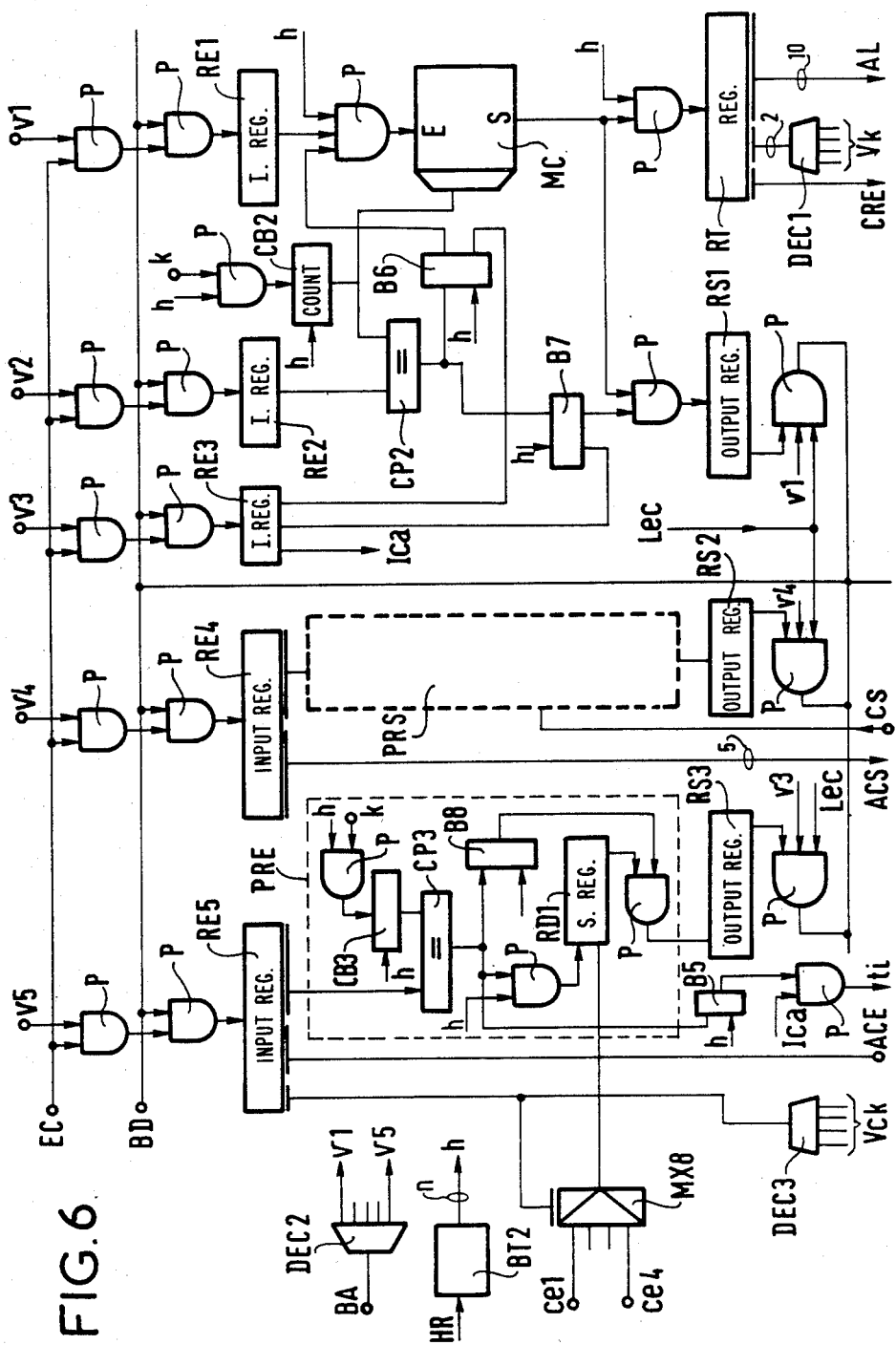
FIG. 6 is a diagram of the main circuits of a switch including the portion shown in detail in FIG. 5.

The control circuit CMC is shown in FIG. 6. The main components of this circuit are the control memory MC with a buffer register RT for addressing the buffer memories, active and passive checking control circuits B5 and PRE and PRS, respectively, and inlet and outlet registers RE1 to RE5, and RS1 to RS3 connected to the data bus BD of the microprocessor mPC of the marker (see also FIG. 7).

These circuits are driven by a time base circuit BT2 which is synchronized with the module MB for distributing signals in the switch CX.

The signals for enabling transfers between the registers and the bus BD are supplied by decoding three bits of the address bus BA of the microprocessor mPC by a decoder DEC2 which provides enabling signals v1 to v5, and by read and write control wires Lec and EC coming from the same microprocessor.

The control memory MC comprises 1024 13-bit words making it possible to control 32×32 time slots carried by the 32 outlet links LS. Ten bits are used at the output from the register RT to provide the address AL of the buffer memories, two bits are used to provide the enable signal Vk to enable one of the buffer memory circuits CMT via a decoder DEC1, and one bit is used to control injection of the idle code via a signal CRE.

The following description details the functions performed under microprocessor control, and outlines circuit implementation.

Data is written into the memory MC as follows:

(1) The register RE1 is loaded (signals v1 and EC).
(2) The register RE2 is loaded to contain the address of the word to be written (signals v2 and EC).
(3) Writing: the memory is addressed by the counter CB2 and a comparator CP2 activates a bistable B6 to enable writing when the counter has reached the value written in the register RE2.

The memory MC is read by the marker to test the circuit CMC by comparing the value read with an image of the memory MC written in the marker's memory as follows:

(1) The address is loaded (signals v2 and EC).

(2) The loading memory of the register RS1 is read, as enabled by the comparator CP2 and bistable B7.

(3) The contents of the register RS1 are transferred to the bus BD (v1 and Lec).

Inlet data is sampled as follows:

(1) A 12-bit address is loaded into the register RE5 (signals v5 and EC): two bits address a multiplexer MX8 which receives the samples from the circuit CMT (ce1 to ce4); five bits supply the address ACE, i.e. the number of the link LE; and five bits supply the address of the time slot.

(2) Synchronization on to the time slot to be checked is provided in the circuit PRE by the comparator CP3 comparing the address with the contents of a counter CB3 which is synchronized with the time base.

(3) The sample is loaded at the rate of the link LE, i.e. 2 MHz, into a shift register RD1.

(4) It is transferred into the outlet register RS3 under the control of a bistable B8 which is activated at the end of the sample.

Outlet sampling is performed on identical lines, using registers RE4 and RS2 and a circuit PRS similar to the circuit PRE.

Active checking is performed by:

(1) Loading the register RE5 with an enable signal for the (circuit VCk being supplied by a decoder DEC3 decoding the two bits of the address of the circuit CMT.

(2) The register RE3 is loaded. This register is a control register which provides an injection control signal Ica of the code Ca together with enabling, reading and writing signals for the memory via bistables B6 and B7, and also resetting to zero signals. A bistable B5 enabled by the outlet signal from the comparator CP3 provides a ti pulse when the signal Ica is provided.

Figure 7:
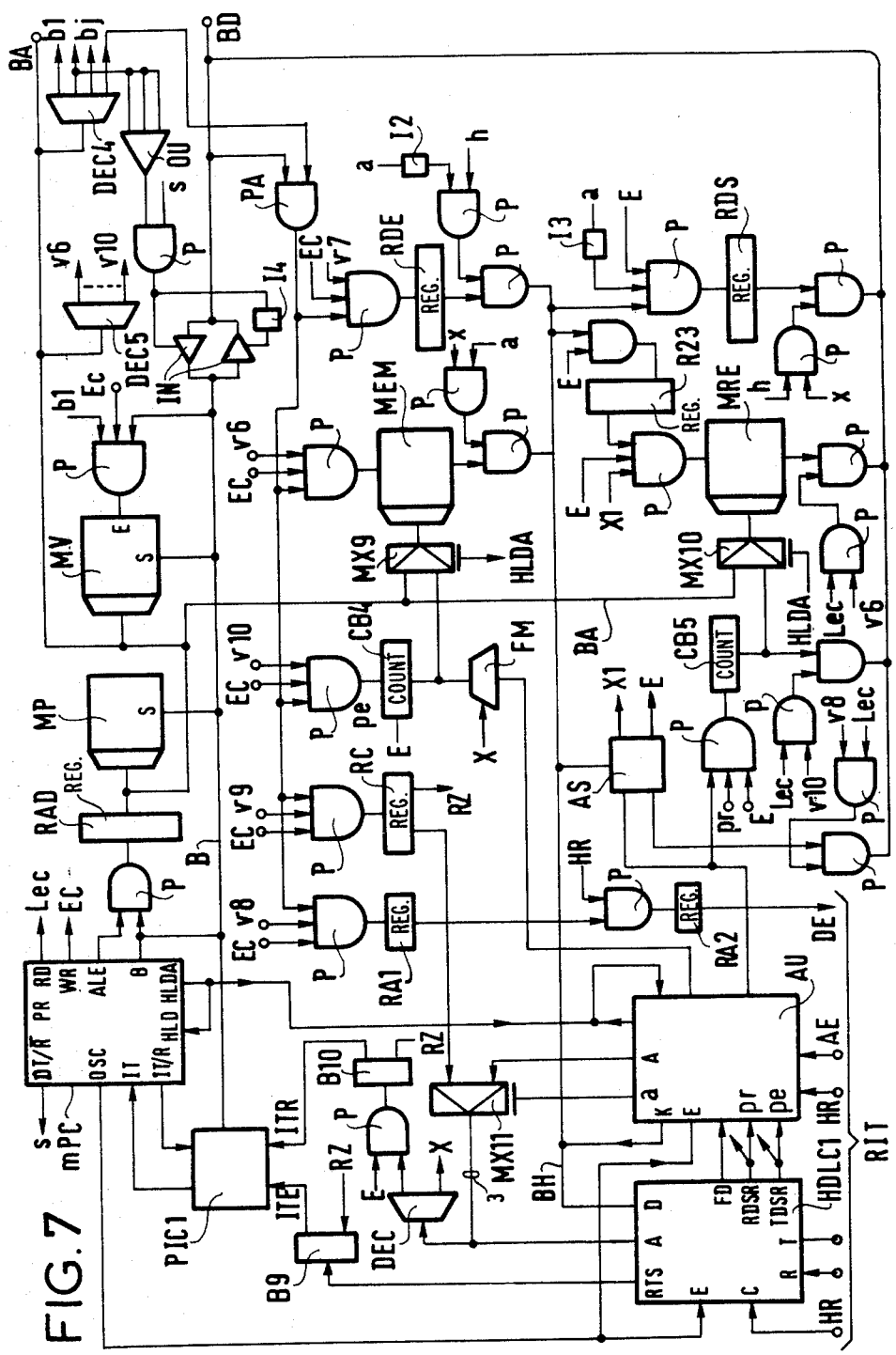
FIG. 7 is a circuit diagram of a marker and a circuit for controlling access to control links.

The marker MQ1 and the access to the point-to-point links RIT are shown in FIG. 7.

The marker MQ1 includes a microprocessor mPC, eg. an INTEL 8086 circuit associated with an INTEL 8284 clock circuit. An internal bus B feeds the address bus BA via an address register RAD, and a data bus BD via a directional interface IN under the control of the microprocessor mPC. The interface IN direction is controlled by a combination of an output signal s from the DT/R output of the microprocessor combined with the input/output address received by an OR gate and a decoder DEC4.

The microprocessor MPC is associated with a program memory MP, eg. a REPROM and a read/write data memory MV.

The unit providing access to the RIT links comprises a circuit HDLC1 for controlling data interchange using the HDLC procedure, an interface driver AU and intermediate buffer memory memories for sending MEM and receiving MRE.

The HDLC1 circuit may, for example, be a MOTOROLA type 6854 circuit.

The driver AU is made in known manner from a logic circuit comprising a read only memory associated with an input register to receive input information, and an output register to receive data from the memory. Both registers are clocked by clock signals supplied to an input E via the OSC output from the microprocessor, which signals also drive the circuit HDLC1. The inlet to the access unit is connected to the bus BD under the control of an access gate PA itself controlled by an address bj coming from the decoder DEC4.

Access is provided in a manner analagous to that already described for the control memory circuit CMC:

(1) Control signals WR and RD (wires EC and Lec) from the microprocessor are used together with a select signal (v6 to v10) obtained by the decoder DEC5 acting on the address.

(2) Multiplexed addressing of the memories MEM and MRE, firstly by the microprocessor via the bus BA and secondly by the interface driver AU via the counters CB4 and CB5 and the multiplexers MX9 and MX10 in a manner described below.

(3) The following additional circuits are used:
  (a) An inlet data register RDE connected between the gate PA and the bus BH of the circuit HDLC1.
  (b) An outlet data register RDS between the buses BH and BD.
  (c) An inlet buffer register R23 for the memory MRE.
  (d) A control register RC containing instructions for resetting the internal registers of the circuit HDLC1 to zero (inlet A corresponding to the instructions R/W, RS0, RS1 of the 6854 circuit) supplied via a multiplexer MX11 driven by the output from the interface driver AU, whereby the circuit HDLC1 can be driven either by the microprocessor or by the interface driver.
  (e) Calling registers RA1 and RA2 to provide access to the link RIT, the microprocessor loads the register RA1 and clock signals HR from the link RIT transfer the information into the register RA2 and apply a mark to a wire DE, authorization to send in reply AE is received by the driver AU.
  (f) A circuit for recognizing the control unit address AS, this address is used to identify the control units connected to the RIT links, and is hard wired in each circuit to be compared on receiving a signal with the internal address in the messages, and on sending a signal it is inserted into the messages.
  (g) A programmable circuit PIC handling microprocessor interrupts in order to cope with requests for service from the interface driver both when sending and when receiving. An INTEL 8259 circuit could be used, for example. For transmission, the output RTS of the circuit HDLC1 provides an interrupt signal ITE directly via a bistable B9. For reception, an interrupt signal ITR is provided by the driver AU which actuates a bistable B10. These bistables are reset to zero by a signal RZ supplied by the microprocessor via the register RC.

These circuits operate as follows:

When the microprocessor mPC requests to send:

(1) The memory MEM is loaded by the microprocessor mPC, the memory may contain a complete n byte message with the address of the last byte being loaded into the counter CB4.

(2) The memory is read by the circuit HDLC1 under the control of the interface driver.

(3) The counter CB4 is caused to count down under the control of a ready to send signal pe supplied by the circuit HDLC1 indicating that its send register is empty.

(4) Access from the output of the memory to the bus BH is enabled by the interface driver whose outputs a and A supply a code X for controlling writing in the send register of the circuit HDLC1.

(5) When the counter has counted down to 0, an end of message decoder FM informs the driver, and the driver causes the circuit HDLC1 to send appropriate end of message codes.

To receive messages over the link RIT, detection of the beginning of a message is marked on an output FD of the circuit HDLC1, thereby informing the driver AU. The driver causes the receive register of the circuit HDLC1 to be read and the circuit AS recognizes the address of the marker. For each byte received, the circuit HDLC1 activates its output RDSR to supply a ready to receive signal pr. The signal pr enables the clock the counter CB5. The interface driver causes the receive register of the circuit HDLC1 to be read and the data to be written into the memory MRE by means of a signal X1. The driver then calls the microprocessor mPC. Several messages may be queued up in the memory MRE.

The microprocessor reads the counter CB5 and each of the messages contained in the memory.

Each message gives rise to an acknowledgement message in return.

The functions performed by the marker are essentially functions of connection, disconnection and surveillance.

The marker executes orders supplied by the control unit UC with which it is associated. Some orders give rise to a report message.

The connection functions serve to set up a one-way connection, i.e. between one time slot of an inlet link LE and one time slot of an outlet link LS. Each connection may be associated with three sorts of surveillance: active surveillance of the connection (message bit C); a test to see whether the outlet link LX is idle before connection (bit R); and a test to verify conformity with a pre-existing connection (bit T).

The data part of a message comprises seven bytes: one function byte having the format 0 0 0 0 1 T R C; and Three 2-byte addresses (inlet address, outlet address, old inlet address for use in the conformity test).

Disconnection functions are simple disconnection, with or without a conformity test, and overall disconnection of a plurality of time slots in a single outlet link LS.

The message comprises six bytes:
Function code (one byte);
Address of the appropriate outlet link LS (one byte);
32 bytes, each corresponding to a respective one of 32 time slots, indicating the time slots to be disconnected.

Surveillance comprises active checking, passive checking and checking by rereading a connection in the control memory MC.

Figure 8:
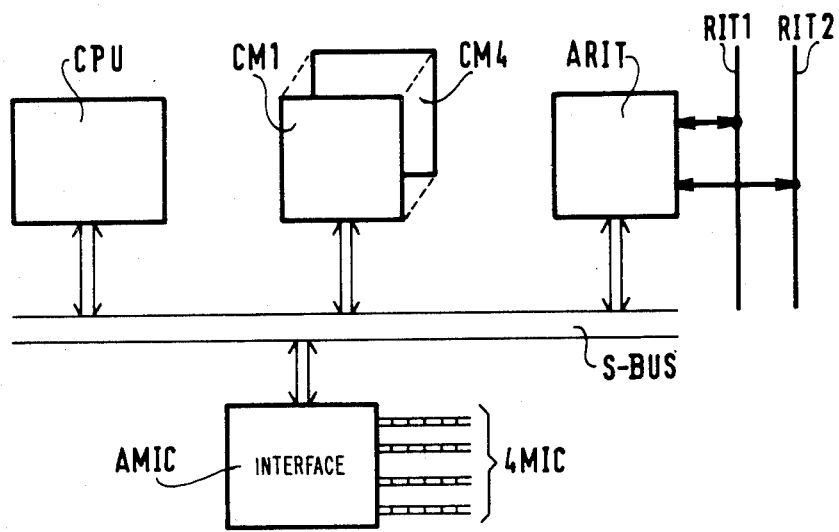
FIG. 8 is a block diagram of a control unit.

A control unit UC is shown diagramatically in FIG. 8.

A control unit UC comprises the following members connected to a system bus S-BUS:
(a) A processor card CPU;
(b) Memory cards such as CM1 to CM4;
(c) An interface card ARIT for interfacing with the links RIT1, RIT2; and
(d) An interface card AMIC for interfacing with PCM links labelled MIC which serve telephone terminal units, for example.

The CPU and ARIT cards together with the S-BUS bus are described below, as is the controller DR1 which controls access to the link RIT1.

Figure 9:
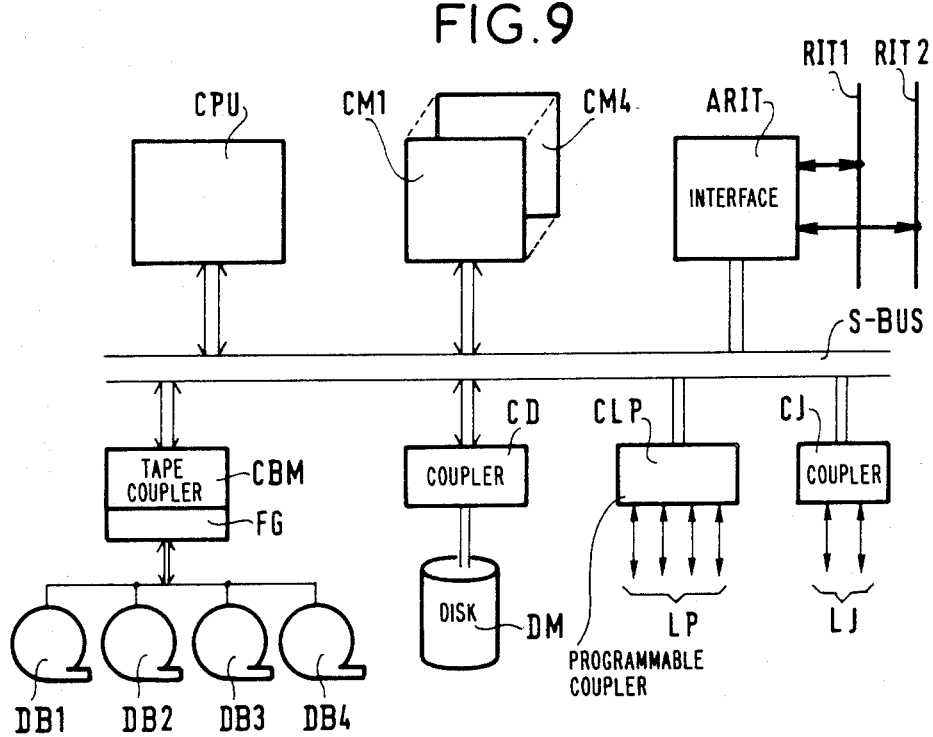
FIG. 9 is a block diagram of a control unit showing computer peripherals.

A peripheral control unit UPC is shown diagramatically in FIG. 9 and is of similar architecture to one of the control units UC. It comprises peripheral couplers such as:

(a) A magnetic tape coupler CBM associated with a formatting logic circuit FG which controls four tape drives DB1 to DB4;
(b) A coupler CD for a disk DM;
(c) A programmable coupler for digital links CLP for controlling, for example, four links LP which are separately usable in synchronous or asynchronous modes; and
(d) A coupler CJ for links LJ of the LX25 type as defined by the CCITT.

Figure 10:
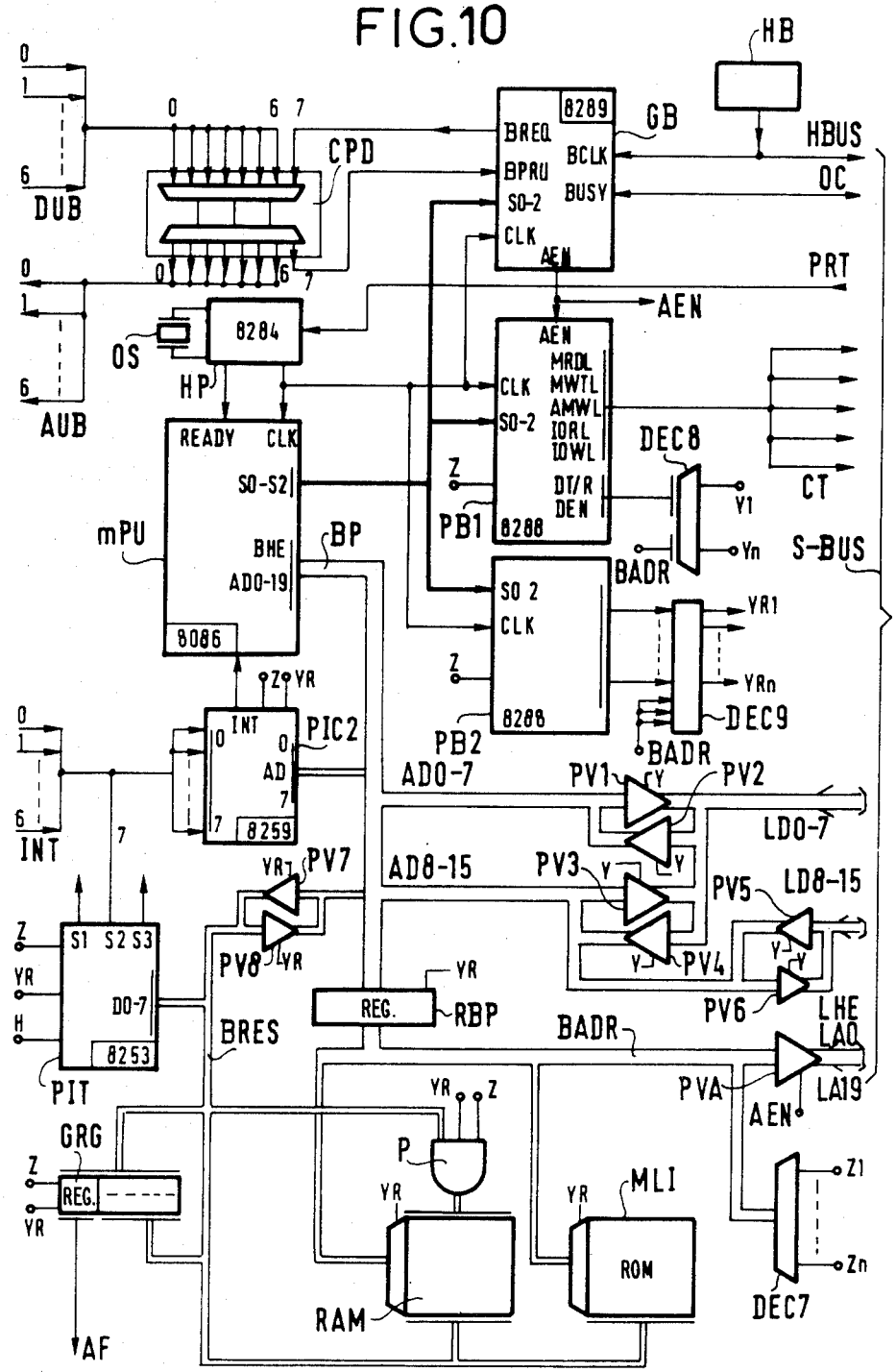
FIG. 10 is a simplified circuit diagram of the processor card in a control unit.

The processor card CPU and the system bus S-BUS are shown in greater detail in FIG. 10.

A microprocessor mPU has access to the system bus S-BUS and to a resident bus BRES for controlling the resources on the CPU card itself: namely a read only memory MLI containing initializing programs, read/write memory RAM, registers, and timing means.

In this application, the microprocessor mPU (FIG. 10) is constituted by an INTEL circuit type 8086. Other INTEL circuits in the same family are also used and are introduced in turn in the following description, naturally other circuits could have been used, but it is convenient to remain within a single family. For a detailed description of the state of the art reference can be made to the INTEL manual entitled "The 8086 Family User's Manual, October 1979", and in particular to the chapter concerning the "Multibus" bus system.

The interfaces to the processor bus BP (outputs AD0 to AD19 of the 8086 circuit) are as follows:

(a) A bus register RBP gives access to an address bus BADR. This bus is connected to the addressing inputs of the read only memory MLI and the read/write memory RAM, to a decoder DEC7 which provides Z addresses, eg. Z1 to Zn for enabling various circuits on the card, and to a group of enabling gates PVA having three state outputs for supplying addresses to the address lines LA0 to LA19 of the bus S-BUS.

(b) Pairs of three state gates PV1 to PV6 providing two-way access to the data lines LD0 to LD15 of the bus S-BUS, where:
PV1 and PV2 provide access between AD0-7 and LD0-7;
PV3 and PV4 provide access between AD8-15 and LD0-7;
PV5 and PV6 provide access between AD8-15 and LD8-15;

An indication of the byte sent or received over the lines LD0-7 (i.e. more or less significant byte) is provided by an output BHE from the processor which is connected to the register RBP and to a line LHE of the S-BUS.

(c) Access to the 16-wire resident data bus (BRES) is provided by a pair of three state gates PV7 and PV8.

The resident bus BRES provides access to the following circuits:
(a) RAM memory (read and write) and ROM memory MLI (read only).
(b) A group of registers GRG (input registers and some input/output registers), in particular via a wire AF leading to a display device (not shown).
(c) A triple programmable counter PIT, eg. an 8253 type circuit which is used as follows:
Output S1 monitors the duration of S-BUS usage, and releases the bus if it has been used for too long.

Output S2 provides interrupts for time marking.

Output S3 is a count output used for measuring time.

Interrupts are handled by a programmable circuit PIC2, eg. an 8259 type circuit, which receives interrupts INT from the counter PIT and from couplers on lines INT0 to INT6. The circuit PIC2 and analogous circuits situated in the couplers operate in master/slave mode, with circuit PIC2 being the master. This circuit is directly connected to the wires AD0 to AD7 of the bus BP.

Control of the buses and circuits on the processor card CPU is as follows:

(a) Outputs S0 to S3 of the control links to the microprocessor mPU are connected to bus controller circuits PB1 and PB2 (8288 type circuits) and to a circuit GB for controlling access to the S-BUS (an 8289 type circuit). The clock for the circuits mPU, PB1, PB2, and GB is provided by an oscillator OS and a clock circuit HP (an 8284 type circuit). This circuit receives "ready to transmit" signals PRT from the couplers connected to the S-BUS and synchronizes them with the clock to apply a "READY" signal to the microprocessor circuit MPU. An enable output "AEN" from the circuit GB is connected to the circuit PB1 and to the gates PVA.

(b) The circuit PB1, an 8288 type circuit in this case, provides:

Read and write control signals in memory access mode or read/write control signals for the S-BUS via wires CT;

Control signals Y1 to Yn for the pairs of gates PV1 to PV6 giving access to the S-BUS: the Y control signals are applied at the output of a decoder DEC8 which receives the DT/R and DEN outputs from the circuit PB1 together with the least significant bit wire from the bus BADR.

(c) The circuit PB2, likewise an 8288 type circuit, provides internal enabling signals YR, such as YR1 to YRn to the circuits PIT, PIC2, PV7, PV8, RBP, RAM, MLI and GRG via a decoder DEC9.

The S-BUS is shared between microprocessor MPU and the couplers, as is explained in greater detail below, eg. via direct memory access (DMA mode). The S-BUS control signals are as follows:

(a) Bus requests DUB and bus authorizations AUB: the point-to-point links to the couplers are handled by a priority coding and decoding circuit CPD on the card CPU. The circuit CPD receives the processor leads BREQ and BPRU from the circuit GB on its highest priority input/output circuit (No. 7).

(b) The S-BUS clock "H-BUS" is supplied by a clock HB which also feeds an input BCLK to the circuit GB.

(c) A wire OC indicating the busy status of the bus is connected to the "busy" terminal of the circuit GB.

In this application, known art has been used and then adapted to improve speed and simplicity in handling data interchanges between the processors, in particular by handling the couplers in memory space and in using point-to-point mode for processing information concerning interrupts and concerning the setting up of a data interchange:

(a) The couplers AMIC to the PCM links MIC have interchange memories which are accessible to the microprocessor mPU.

(b) The couplers ARIT to the links RIT1 and RIT2 have access to the system memories in DMA mode.

Figure 11:
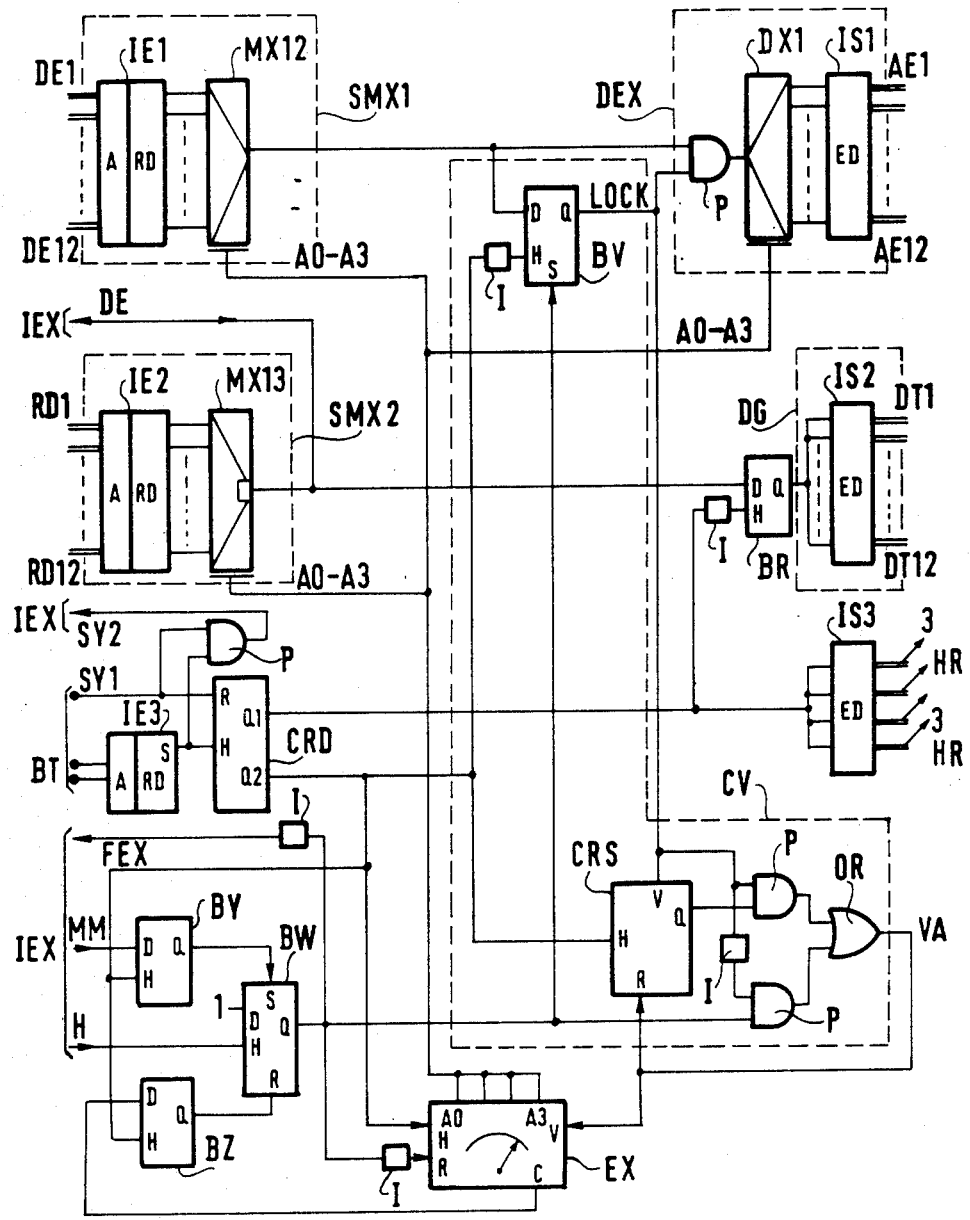
FIG. 11 is a simplified circuit diagram of a controller for handling access to links for data interchange between various processors.

One of the point-to-point link controllers DR1 or DR2 is shown diagrammatically in FIG. 11.

In this application of the invention, modular controllers are used as descibed below.

A controller module serves to connect twelve control units UC or UCP, or markers MQ. Each unit or marker is connected to each link RIT1 and RIT2 of the RIT network via five pairs of wires having the following functions:

(a) DE: request access to the duplicated network RIT1, RIT2.

(b) AE: access authorization.

(c) RD: data to be transmitted (from station n to the links RIT1, RIT2 of the network RIT).

(d) DT: data to be transmitted (from the network RIT1, RIT2 towards a destination station).

(e) HR: synchronizing clock.

The controller module comprises inlet interfaces IE1 to IE3 comprising a matching circuit A and a differential receiver RD, outlet interfaces IS1 to IS3 comprising differential senders ED, and multiwire extension links IEX for interconnecting the modules to each other.

The inlet interface IE1 is connected to twelve pairs of access request links DE1 to DE12, the inlet interface IE2 is connected to twelve pairs of data transmission links RD1 to RD12, and the inlet interface IE3 is connected to receive signals from a 4 MHz clock provided by a time base BT for the equipment as a whole. The access request links DEn and the data transmission links RDn go to twelve respective control units or markers.

The outlet interfaces IS1 are connected to access authorization links AE1 to AE12 and the outlet interfaces IS2 are connected to data transmission links DT1 to DT12. The outlet interface IS3 distributes a clock signal HA over four pairs of wires which each serve three stations (i.e. control units or markers) in parallel. The links DE1 to DE12, AE1 to AE12 and RD1 to RD12 are sequentially enabled by a scanning counter EX which addresses respective multiplexers MX12 and MX13 and the demultiplexer DX1 (addresses A0 to A3).

Data signals DT and clock signals HA are sent simultaneously to all the stations UC, UCP and MQ. The clock signals HA are at a frequency of 1 MHz obtained by dividing the signals from the basic clock BT via a counter CRD. The basic block also transmits a frame synchronization signal SY1 which is applied to the reset to zero input of the counter CRD. The frame sync signal SY1 of the first module is sent via a gate P and a wire SY2 in the link IEX to an SY1 input to the other modules in series.

Link seizure by one of the stations UC, UCP or MQ is stored in an enabling bistable BV which provides a LOCK signal to stop the scanner EX via the counter CRS and to provide access to the demultiplexer DX1 which gives an authorization signal AE.

Data received over the wires RS are regenerated by a bistable BR. The data received by one module may be forwarded to a unit connected to any of the modules. The multiplexer MX13 has a three state output multipled via the wire DE of the link IEX with the equivalent multiplexers of the other modules.

The duration for which any of the stations is allowed to seize a link in the network is limited to 10 ms by the monitoring counter CRS which generates a signal VA via a hard wired logic circuit comprising gates P, I and OR, to authorize the scanner to continue scanning if the time limit expires.

The Q2 output from the counter CRD supplies clock signals to the circuits ES and CRS, and inverted clock signals to the circuit BV. The send clock signals provided by the Q1 output of the counter CRD pass via a phase inverter I to the regenerator bistable BR at a frequency of 1 MHz.

The duplicated controller DR1, DR2 operate as follows:

(a) Starting up: the first module of the controller receives a signal MM on a bistable BY driven by the Q2 output of the counter CRD. The Q output of the bistable BY sets an authorization bistable BW and thereby frees the scanner EX.

(b) Taking a send request DE1 into account: when the scanner EX addresses the corresponding inlet to the interface IE1, the bistable BV delivers a LOCK signal having the following three actions:

A gate P providing access to the demultiplexer DX1 is opened and an authorization signal AE1 is sent;

The surveillance counter CRS is authorized to progress; and

The scanner EX is stopped (by closing a gate P).

(c) End of sending: the signal DE1 is removed before 10 ms is up, thereby resetting to zero the signals AE1 and LOCK and resetting to zero the counter CRS, and releasing the scanner EX.

(d) Time out before end of sending: the output from the counter CRS opens the gate P thereby releasing the scanner EX.

(e) End of scanning: the end of count output C from the scanner EX is connected to the P input of a bistable BZ which controls the resetting to 0 of the bistable BA. This then controls, via a wire FEX in the link IEX the clock input H to the bistable BA of the following module. When all the modules have performed a scan, the cycle starts again.

Figure 12:
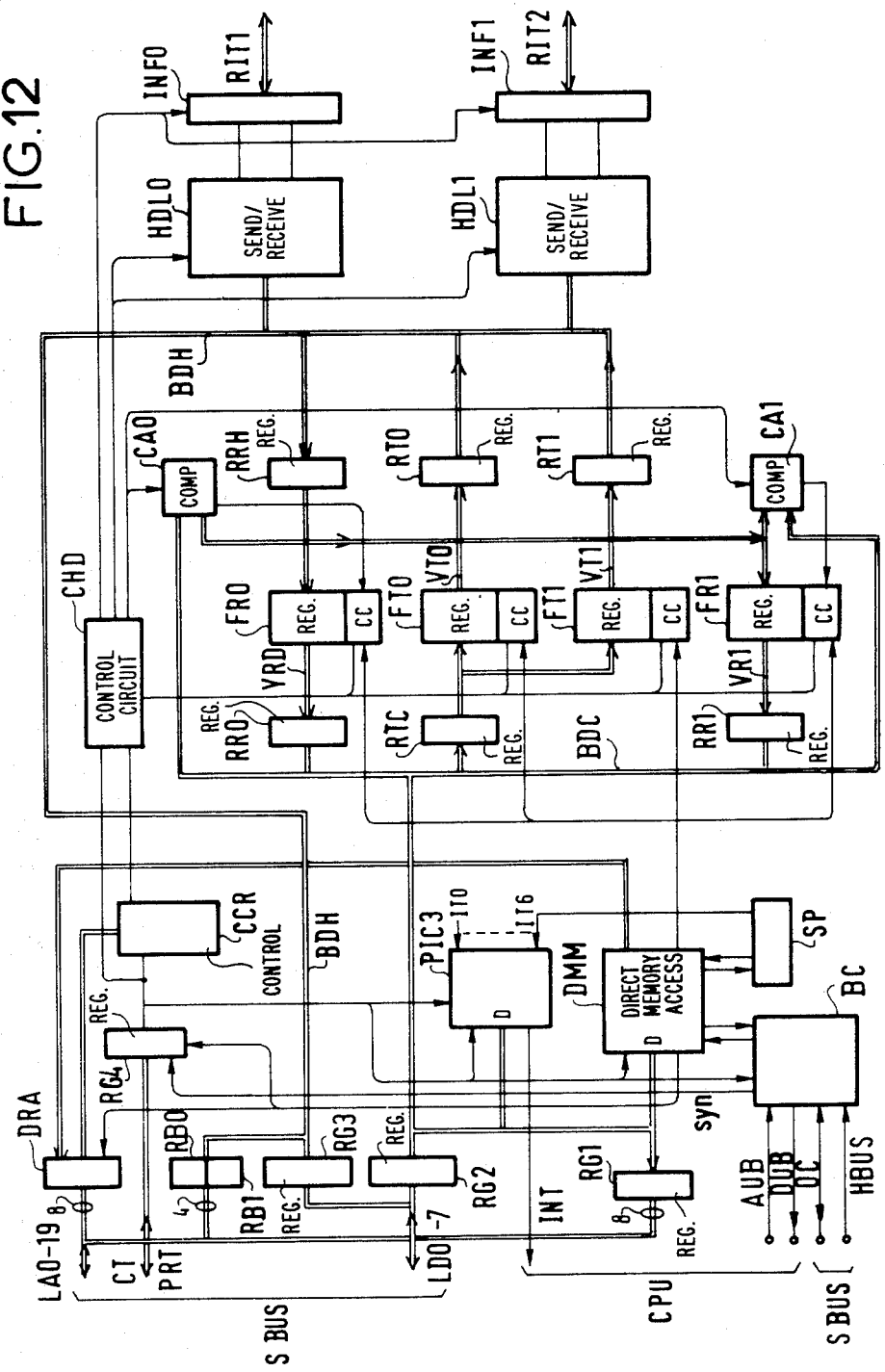
FIG. 12 is a simplified circuit diagram of a coupler providing access to the data interchange links.

FIG. 12 is a circuit diagram of a coupler ARIT for providing connections to the data interchange network RIT. It controls a dialogue or data interchange between processors. It occupies one printed circuit card in the processor rack. It is connected both to the S-BUS of the processor to interchange messages by the direct memory access procedure (DMA), and also to the links RIT1 and RIT2 of the data interchange network RIT for interchanging data using the HDLC procedure of the same type as that which has been described above for markers.

The coupler provides simultaneous access to both links RIT1 and RIT2 of the network RIT and simultaneous transfer operations via a direct memory access circuit DMM, and includes circuits HDL0 and HDL1 for supervising data interchanges as described below.

To do this the coupler comprises four internal paths and each path is associated with a FIFO (first in first out) type storage register having a capacity of 64 bytes. In particular, a register FR0 in a reception path VR0 is associated with the link RIT1. A register FR1 in the reception path VR1 is associated with the link RIT2. A register FT0 in a transmission path VT0 is associated with the link RIT1. And a register FT1 in a transmission path VT1 is associated with the link RIT2.

These paths have access via a bus BDH to the processing data interchange circuits, to an internal bus BDC, and to the circuits HDL0 and HDL1.

Data transfers between each register FR or FT and the bus BDC or BDH are synchronized by means of buffer send registers RTC, RT0, RT1 and receive registers RRH, RR0 and RR1.

A generalized interchange procedure is used both when sending and when receiving.

When sending, the processor enables the circuits DMM and HDL0 and supplies a signal DE0 requesting seizure of a link such as the link RIT1 in the network RIT. After an acknowledgement signal AE0 from the link RIT1, the direct memory access circuit DMM begins to transfer data from the processor memory to the register FT0 in the path VT0 in packets of sixteen bytes, until the register is full. The circuit HDL0 begins to transmit as soon as the first byte is available, and continues until the circuit DMM signals the end of the message and the register is emptied. Circuit HDL0 terminates the message. The link RIT1 is released and an interrupt is sent to the processor requesting it to read the state register of the circuit HDL0.

The various interrupts are handled on the coupler card by a programmable circuit PIC3, for example an INTEL type 8259A circuit. This circuit is driven by the 8259A circuit of the processor in master/slave mode. Data interchange is either by an interrupt INT and acknowledgement signal INTA, or else by the slave circuits being scanned by the master circuit.

When receiving, the processor enables the DMM circuit and the receiver of the circuit DDL0. After detecting a flag, the following byte is compared with the coupler address. If there is a match, sixteen bytes are loaded into the register on the path VR0 and a service request is sent to the circuit DMM. A new request is sent for each packet of sixteen bytes, until an end of message flag which occurs when the register FR0 is empty. The receiver is disabled and an interrupt is sent to the microprocessor requesting it to read the state register of the circuit HDL0, and also of the direct memory access circuit DMM which indicates the length of the message and its address in memory.

The processor supervises direct memory access for transferring the packets of sixteen bytes, but the direct memory access circuit DMM controls the transfer of each packet directly, taking control of the S-BUS for the duration of the transfer.

The coupler is considered by the processor as part of its memory address space, and the only instructions the processor needs to use, apart from those required for handling direct memory access are read instructions Lec and write instructions EC together with the response of the addressed device, i.e. a ready signal sent over the wire PRT of the S-BUS as defined above.

The coupler circuits mentioned above are interfaced with the S-BUS, and in particular they have access to the address lines LA0 to LA19, the data lines LD0 to LD7, and the transfer control lines CT and PRT for controlling the S-BUS. The eight least significant address lines (LA0 to LA7) are connected to a two-way driver access circuit DRA. During transfer to the microprocessor memory in direct access mode these lines receive data from the direct memory access circuit DMM. The address lines LA8 to LA15 receive data in direct access mode from the circuit DMM via an output register RG1. During input these lines are connected to the destination circuits. The remaining address lines LA16 to LA19 receive data via two block address registers RB0 and RB1 each of which is associated with one of the links in the network RIT. The registers are loaded from the processor via the data bus and indicate the 64 K-byte block of memory in which the message received should be stored. When sending, the direct memory access circuit DMM reads the message in the block whose base address is equal to zero.

Internal use of the bus lines by the coupler is described below. Only the eight data lines (LD0 to LD7) are used. They are connected via two-way registers RG2 and RG3 to the internal buses BDL and BDH. The direction of data transfer is controlled by the direct memory access circuit DMM.

A register RG4 serves to relay the transfer control lines CT and PRT and during input the read/write control signals, thereby enabling these control signals to be synchronized with a signal "syn" provided by a bus control circuit BC.

When sending, the signals are supplied by the direct memory access circuit DMM. The signal PRT is also sent by the bus control circuit PC on the basis of the signal "syn". The lines providing control of the S-BUS by the bus controller circuit BC comprise the wires for seizing and releasing the bus, namely the bus clock synchronization line HBUS, the line DUB by which the direct memory access circuit DMM requests use of the bus, and the line AUB by which the processor authorizes use of the bus.

The bus controller circuit BC serves merely to relay these signals and to synchronize them with the bus clock.

The coupler circuits also include a control circuit CCR. This circuit decodes data on the address lines LA and on the line CT in order to provide control signals to the circuits in the coupler.

To control the coupler, the processor uses 64 memory words in a 16 Kbyte block identified by hard wiring on the connector in which the coupler card is inserted. The 64 words are addressed by the six least significant bits of the address lines LA. The four bits LA0 to LA3 define the instruction and the e bits LA4 and LA5 define the circuit addressed by that instruction.

The direct memory access circuit DMM is an INTEL type 8257 programmable circuit. This circuit is capable of controlling four different paths, and it is used to transfer packets of 1 to 16 bytes.

It is associated with a buffer register RTC for sending to the registers FT0 and FT1 on the paths VT0 and VT1, with receive buffer registers RR0 and RR1 connected to the registers FR0 and FR1 on the paths VR0 and VR1, and with a circuit SP for supervising the duration of seizure of the S-BUS.

The circuit SP includes counters to measure the duration of direct memory access, as controlled by the presence of the signal PRT, and also for counting the number of characters transmitted which is limited to a maximum of 16 before the bus is released. In the event of overflow, the circuit SP sends an interrupt request signal to the circuit PIC3.

For sending and for reception, the registers FR0, FR1, FT0 and FT1 in the four paths each include a control circuit CC comprising a counter which provides the following data which is required for controlling data transfers: register empty; sixteen characters in the register; and register full.

The transfer of data to the processor in the direct memory access mode, i.e. writing directly into the processor memory, is initialized by the circuit DMM which applies a data request signal on the output D-REQ output of the 8257 package. For example, on the path VR0, transfer from the register FR0 to the circuit DMM begins when the control circuit CC indicates that the register is full. The circuit DMM then performs the transfer until it receives a "register empty" signal or an "end of message" signal which is supplied from the circuit HDL0 on detection of a character which flags the end of transmission.

Data transfer from the processor in direct access mode is performed by initializing the circuit DMM and transferring data until the register FT0 is full or until an end of transfer signal is provided by the circuit DMM.

The circuit PIC3 handles three kinds of interrupt for each of the links RIT1 and RIT2, namely:
End of packet transfer interrupt (IT0, IT3);
End of message reception interrupt (IT1, IT4); and
End of message sending interrupt (IT2, IT5); and also a S-BUS usage timeout interrupt from the circuit SP (interrupt signal IT6).

The send/receive circuits HDL0 and HDL1 are of the same type as the circuit HDLC1, and they are connected to their respective links of network RIT via respective interfaces INF0 and INF1 which provide electrical conversion of and also serve to relay send request signals AE and send authorisation signals DE. The instructions for driving the circuits HDL0 and HDL1 are provided by a control circuit CHD which is connected to the circuits CCR, RG4, CA, HDL0, HDL1, and INP. The control circuit CHD includes a multiplexer corresponding to each of the circuits HDLn for switching instructions thereto from its internal registers, in a manner analogous to the multiplexer MX11 (see FIG. 7). The control circuit CHD may be realized in the form of hard-wired logic or else in the form of a PROM type memory circuit with functions comparable to those of the circuit AU (see FIG. 7).

The control circuit CHD is also connected to two address recognizing circuits CA0 and CA1 for recognising the addresses of units or markers. These circuits are loaded via the bus BDC on an instruction from the microprocessor mPU and they receive the address contained in the message on the receive channel at the output from the buffer register RRH. Data interchanges between the circuits HDLn and the registers FTn is as follows when sending over the network RIT.

After seizing a link such as RIT1, and after the processor has set the circuits DMM and HDL0 into send mode, a character is transferred from the register FT0 and the circuit HDL0 via the buffer register RT0 at an instant when the circuit CC of the register FT0 indicates that a character is available at the output of the register FT0 or that the circuit HDL0 is ready to send as is indicated by a flag signal on its output TDSR (see FIG. 7).

The characters are transmitted under the control of the circuit CHD until the end of the message as indicated by the "end of message" signal provided by the circuit DMM, and the "register empty" signal provided by the relevant circuit CC.

When receiving from the link RIT1, after the circuits HDL0 and DMM have been readied, the first character is transferred as soon as the circuit HDL0 is ready to receive as is indicated by a flag signal on its RDSR output (see FIG. 7), and the buffer register RRH is available, supposing that the receive path VR0 was not already active.

The first character is compared with the address loaded by the processor in the recognition circuit CA, to recognize the destination unit or marker before transferring the following characters.

If the comparison fails, a second comparison is made with an invariant character, which is the same for all units and markers (eg. hexadecimal FF). This procedure enables the processor to broadcast a message to all the units and markers connected to the network RIT.

Further, the presence of two comparator circuits CA0 and CA1 makes it possible to use a different unit or marker address for each of the links RIT.

The end of message procedure begins as soon as the circuit HDLn detects the end of signal flag.

As indicated above, the circuts of the coupler are driven by the processor on the basis of the following information:

Addresses 0 to 63 provided by address lines LA0 to LA5;

Read/write signals via the wires CT; and

Data on wires LD0 to LD7.

The main instructions used are indicated by way of example for the circuit PIC3. The example is of normal use of the instructions CT connected to the R/W inputs of the circuit 8259A for reading or writing in the internal registers of that circuit.

For the base registers RB1 and RB2, data D0 to D3 is loaded by means of a write instruction.

For the unit or marker addresses in the comparator circuits CA0 and CA1, data is loaded on the data lines D0 to D7 via a write instruction.

For the direct access memory circuit DMM, reading and writing of a memory address for said direct access is provided by two consecutive bytes which are read or written over the data wires D0 to D7.

The index for counting the bytes transmitted is 16 bits long and is therefore read or written as two consecutive bytes.

These instructions are performed separately for each of the four paths connected to the circuit DMM.

The processor also controls the registers which are common to the four paths for reading the register state, and for writing in the control register, the mask register, etc.

Separate reading and writing is provided for the state re.igsters and the control registers of the two circuits HDL0 and HDL1.

Figure 13:
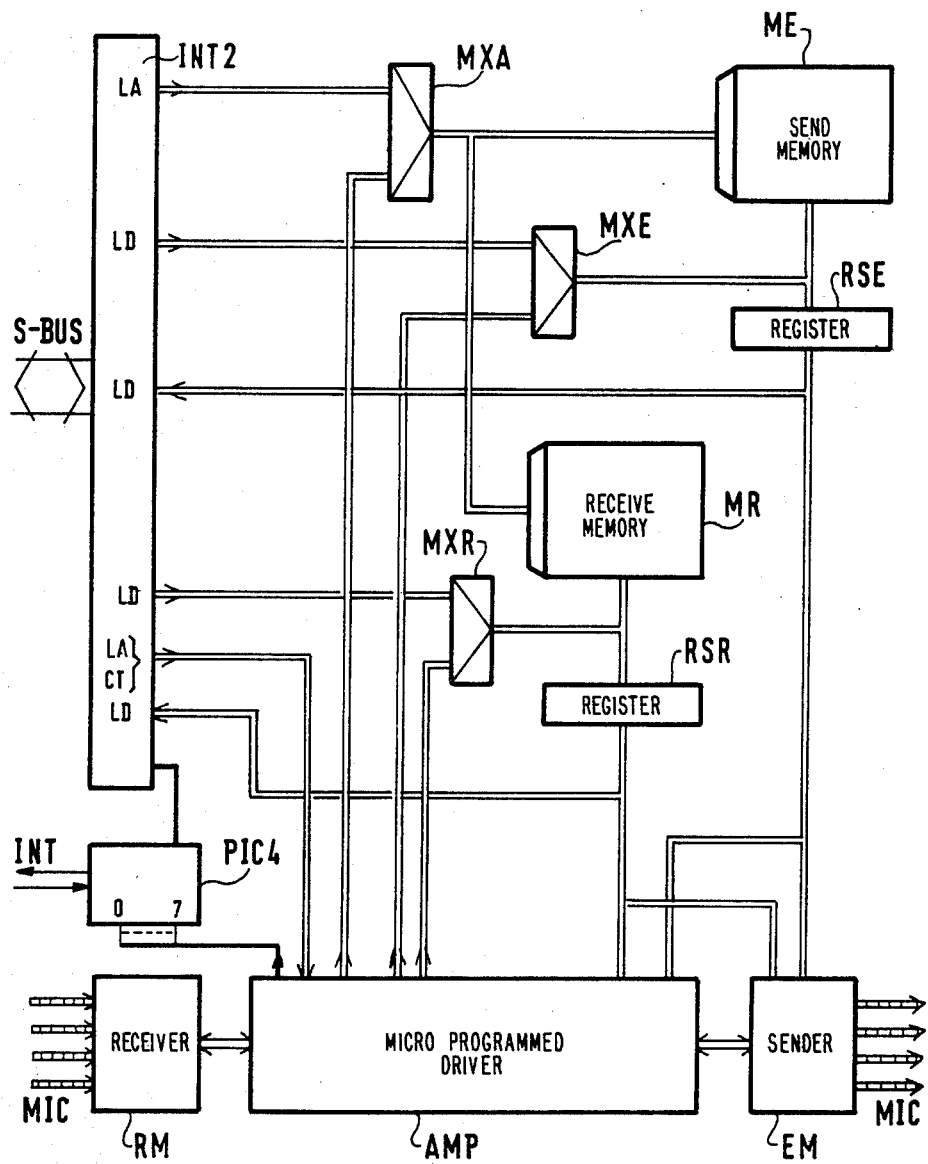
FIG. 13 is a simplified circuit diagram of a coupler for providing access to semaphore channels conveyed via the PCM links.

An interface circuit AMIC between the processor CPU and the switched PCM links of the exchange MIC is shown diagramatically in FIG. 13.

The circuit serves to connect the processor bus to four PCM links MIC serving a group of terminal units.

The circuit described here is designed to serve up to 32 terminal units at most, and uses two kinds of procedure:

(1) Cyclical scanning: the circuit cyclically interrogates all the terminal units UT. Each terminal unit replies either by a simple acknowledgement if it has got nothing to say, or by an event message indicating a change in state, a reply to a processor instruction, or a fault.

In the opposite direction, the processor CPU may send a message to one or several destination terminal units.

(2) A point-to-point procedure capable of being used independently from the send and receive paths. This procedure is used either for maintenance, e.g. for simulating a group of terminal units GUT, or else to establish a semaphore type control link, e.g. according to the CCITT system No. 7.

The circuit for this application comprises the following components:

(1) A microprogrammed driver AMP drives the rest of the circuit and organizes cyclical scanning.

(2) A receive memory MR and a send memory ME driven by counters described below. For each send and receive path, these memories serve to store the parameters and the mode in which the path is being used, together with a file of messages for an active path. The memories are accessible in write mode and in read mode to the processor CPU and to the driver AMP.

(3) Circuits associated with the memories comprising a common addressing multiplexer MXA, and respective access multiplexers MXE and MXR and respective output registers RSR and RSE.

(4) A sender EM and a receiver RM connected to the four PCM links MIC and driven by the driver to perform message interchanges according to the HDLC procedure. The sender and the receiver are of similar structure to the programmable circuits already mentioned (INTEL 8273 or MOTOROLA 6854) but in this particular application they are built up from discrete circuits in order to facilitate adapting them to specific conditions of use in this application.

(5) An interface circuit INT2 providing a connection to the S-BUS of the processor CPU. This circuit is similar to that already described for the circuit ARIT.

(6) An interrupt handling circuit PIC4, e.g. a programmable INTEL type 8259 circuit, connected in slave mode to the interrupt circuit of the processor CPU.

To obtain the speed of data interchange which is desirable for the system, the driver AMP is in the form of a hard wired logic circuit (a read only memory addressed sequentially for cyclical scanning and to apply sequencing signals to the various parts of the circuit AMIC, together with adders to calculate addresses in memory from base addresses and pointers described later), and the following conditions have been chosen for sending and for receiving:

(1) The receiver is attributed to a single link at a time. Messages received on the other three PCM links MIC are ignored.

(2) Sending can take place over one or more links. Active links are designated by a bit mask programmed in the memory. Nonactive links have a high impedance output, which makes it possible to couple the AMIC circuits from the control units UC of a single group GUC to be coupled together.

The circuit AMIC can deal with eight interchange channels over two distinct time slots.

For cyclical scanning mode the following additional conditions have been chosen:

(1) No simultaneous sending and receiving on the same channel.

(2) The send receive channels are attributed to the same time slot.

(3) The same PCM receive link is used by all the terminal units of a group GUT.

(4) The circuit AMIC does not analyze instruction messages. All send sequences must be terminated by receipt of an acknowledgement signal.

The interchange memories have the following structure:

The circuit AMIC is controlled as part of the memory space of the processor, i.e. the processor only requires an address, read and write instructions, and a reply PRT. The circuit AMIC uses 16 Kbytes of memory space. The first bytes are used to identify the circuit and to process interrupts. Each of the memories ME and MR comprises 2 Kbytes.

The content of the send memory is shown in Table 1, it contains 32 2-byte words MC0 to MC31, giving one word per channel whether active or not, and serving to store the channel number, the channel state, and a mask defining which links are active in send mode. The following five states are used:

1: Channel active.

2: Idle: at the end of a scanning cycle, the circuit AMIC requests an interrupt from the processor, and puts the channel into the idle state to inhibit it until the following cycle.

3: Inhibiting access to the receive file and inhibiting the acknowledgement signal for messages of events coming from the terminal units UT. This is to avoid losing message events in the event of the file becoming saturated, and to allow replies to priority instructions to pass first.

4: Stop scanning at the end of the cycle as determined by an address read in the last terminal unit scanned.

5: Transmitting a command message. This state may be enabled from state 2 or state 4.

For each of the n active channels (n=8) the memory ME comprises a channel control block, a table of the addresses of the terminal units handled by the channel, and a file of messages to be transmitted (up to a maximum of 8).

TABLE 1

| MC0 |
| MC31 |
| BC |
| BCN |
| ATU1 |
| ATUN |
| FMT1 |
| FMTN |

TABLE 2

| MC0 |
| MC31 |
| BC |
| BCN |
| ATU1 |

Each block BC comprises thirty-two bytes used as follows:

Byte 0: reserved for communication with the corresponding receive channel.

Byte 1: channel use mode (cyclic scanning or point-to-point).

Bytes 2 and 3: pointers to the beginning and the end of the message file. These pointers are equal when the file is empty.

Bytes 6 and 7: count the number of times a message must be sent

Bytes 8 and 9: start address and pointer to the table of terminal unit UT addresses.

Bytes 10 and 11: define control characters for scanning messages and for acknowledgement requests.

Bytes 12 to 31: pointers associated with each message (8 max) plus two pointers used internally by the driver for transmitting instructions to the terminal units UT handled by the channel.

The receive memory structure shown in Table 2 is similar to that of the send memory. The differences concern the absence of the address table for the terminal units UT and in the use of bytes 6 to 11 of the blocks BC as follows:

Bytes 6 to 7: maximum duration and counter for measuring the waiting period for a reply to a message sent to a terminal unit UT.

Byte 8: unused.

Byte 9: a control character for acknowledgement signals at the end of a send sequence.

Bytes 10 to 11: interrupt level indicator. The receive files only contain event messages in response to cyclical scanning, replies to processor instructions, and error messages. Generally speaking the processor only writes operational data each time it initializes the circuit AMIC. The counters and the pointers are incremented or calculated by the driver AMP.

The main actions of the processor CPU concerning the circuit AMIC are as follows:

Initialization:
    modifying the scan tables (adding or removing terminal units);
    modifying the active channels and the operational parameters;
Scanning the pointers to the receive message files;
Reading the corresponding messages;
Writing messages to the send files;
Interrupts:
    initializing the circut PIC4;
    processing interrupts and reading error messages;
    point-to-point procedure.
Reading and writing operational parameters;
Reading and writing message files.

The general operation of the exchange described above is based on the structure described in detail above, and also on background information which the person skilled in the art can be expected to have available. This information concerns in particular:

Telephone equipment and operation thereof:

Time division switching networks for telephone exchanges.

Processor control: for setting up calls, i.e. call processing software; and exchange management, i.e. operational and maintenance software.

The following description relies on the reader's understanding of the above, and describes in turn: the software organization as based on the particular hardware architecture; the events which take place during a telephone call from the caller initiating the call to the call being terminated; and finally the use of the redundant means.

By the nature of the system, the software is distributed. It is organized in logical machines, each of which is a subset of the software and appears as an independent control unit, communicating with its surroundings only by interchanging messages. The logical machines correspond to functions which are logically independent: processing telephone calls, managing files, processing operator instructions, timing and time of day, . . .

Thus, from the user point of view the network of control units appears as a network of logical machines. This generalization of the hardware architecture stems from two considerations:

(1) Communication by interchanging messages is essential between the different control units since they do not share any memory; and (2) A distinction is drawn between a logical machine and a physical machine since for reasons of economy, several independent functions are performed on a single control unit in order to make the most efficient use of the available memory and computing power. The functions are grouped together on system generation.

Some of the logical machines may be repeated on several processors. For example, one to thirty-two logical machines may exist, each of which handles a certain number of subscribers and circuits to other exchanges. The capacity of the exchange can thus be increased by adding extra control units.

The logical machines are addressed by name rather than by physical location. Sending a message to a logical machine is performed in the same manner regardless of whether the destination logical machine is in the same control unit or in another control unit. Thus, exchange reconfiguration is substantially transparent to most of the programs.

The logical machines have the following characteristics:
(1) They are units for setting up links and for loading.
(2) They are sets of tasks (asynchronous processes).
(3) Messages are addressed to tasks within the logical machines.
(4) Each task is associated with two pending message files: a request file and a file of replies to requests.
(5) The tasks within a single logical machine may, likewise, communicate with each other by interchanging messages.

The operating system is built up around a kernel which is resident in each of the control units. It comprises a bootstrap in ROM (MLI, FIG. 10) capable of loading the remainder of the resident kernel when the system is initialized, together with a system for handling tasks and SGTE interchanges (not shown) which constitute the core of the operating system. The operating system comprises two subassemblies:

(1) A set of common services for handling interchanges, the memory, and tasks. This set comprises various primitives which are called by the logical machines:
 (a) to send a message;
 (b) buffering requests and replies;
 (c) connecting a procedure to an interrupt (such a procedure communicates by messages with other tasks in the logical machine to which it belongs);
 (d) reading various data: the number of the current task, the time, . . .
(2) A logical machine called the supervisor MLS (not shown) which is systematically included in each processor on starting up. The supervisor organizes services concerned with processor management, in particular:
 (a) loading a logical machine into the control unit and activating it;
 (b) indicating where to find the logical machines which are in other processors;
 (c) removing a logical machine;
 (d) restarting the control unit;
 (e) updating its clock.

Further, these supervisors provide functions of testing and protecting the control unit, managing data, and program development.

The example chosen of a telephone call being set up concerns a local call to which the following particular conditions apply:
(1) The called subscriber is free.
(2) The caller is the first to hang up.
(3) The calling and called parties are connected to subscriber terminals which belong to different control units (UC1 and UC2).

Tables 3 to 8 below describe the various phases of the call, i.e. the messages which are interchanged:

Table 3: returning dial tone, dialling, and translation for a rotary dial subscriber.
Table 4: returning dial tone, dialling, and translation for a multifrequency keypad subscriber.
Table 5: local selection.
Table 6: end of selection.
Table 7: connection and speech path verification.
Table 8: caller hang up.

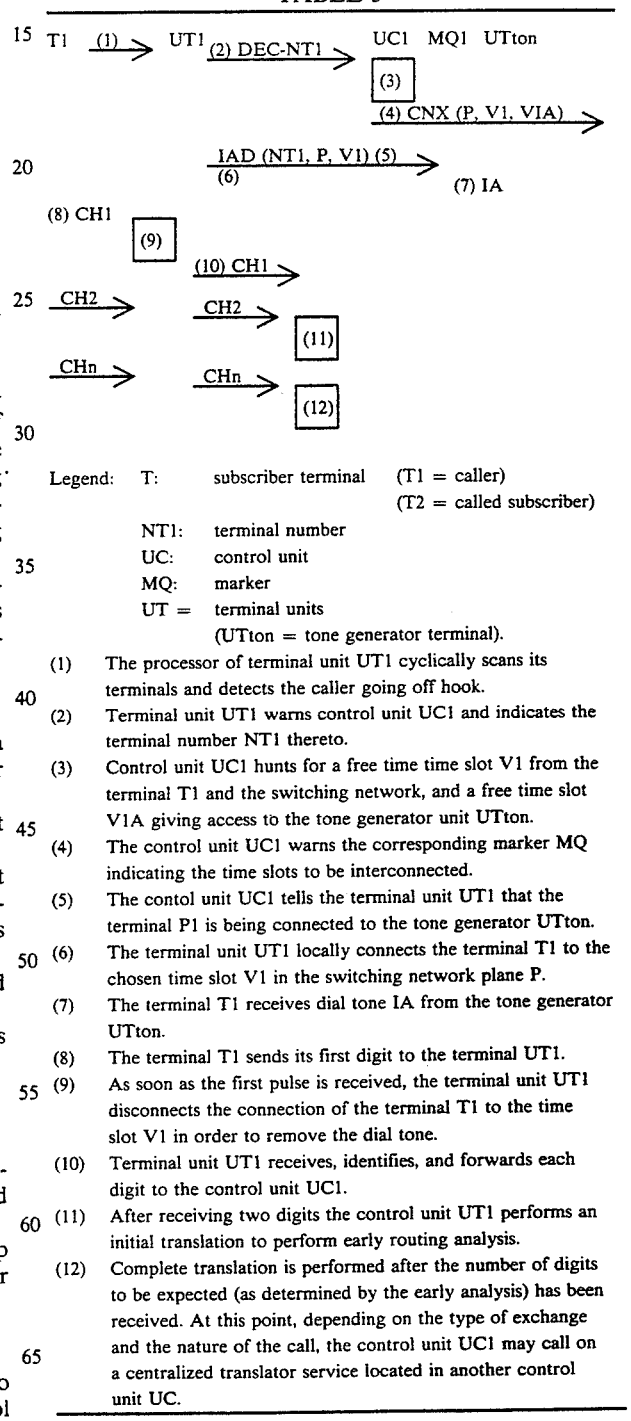

Legend:
T: subscriber terminal (T1 = caller) (T2 = called subscriber)
NT1: terminal number
UC: control unit
MQ: marker
UT = terminal units
(UTton = tone generator terminal).

(1) The processor of terminal unit UT1 cyclically scans its terminals and detects the caller going off hook.
(2) Terminal unit UT1 warns control unit UC1 and indicates the terminal number NT1 thereto.
(3) Control unit UC1 hunts for a free time time slot V1 from the terminal T1 and the switching network, and a free time slot V1A giving access to the tone generator unit UTton.
(4) The control unit UC1 warns the corresponding marker MQ indicating the time slots to be interconnected.
(5) The contol unit UC1 tells the terminal unit UT1 that the terminal P1 is being connected to the tone generator UTton.
(6) The terminal unit UT1 locally connects the terminal T1 to the chosen time slot V1 in the switching network plane P.
(7) The terminal T1 receives dial tone IA from the tone generator UTton.
(8) The terminal T1 sends its first digit to the terminal UT1.
(9) As soon as the first pulse is received, the terminal unit UT1 disconnects the connection of the terminal T1 to the time slot V1 in order to remove the dial tone.
(10) Terminal unit UT1 receives, identifies, and forwards each digit to the control unit UC1.
(11) After receiving two digits the control unit UT1 performs an initial translation to perform early routing analysis.
(12) Complete translation is performed after the number of digits to be expected (as determined by the early analysis) has been received. At this point, depending on the type of exchange and the nature of the call, the control unit UC1 may call on a centralized translator service located in another control unit UC.

TABLE 4

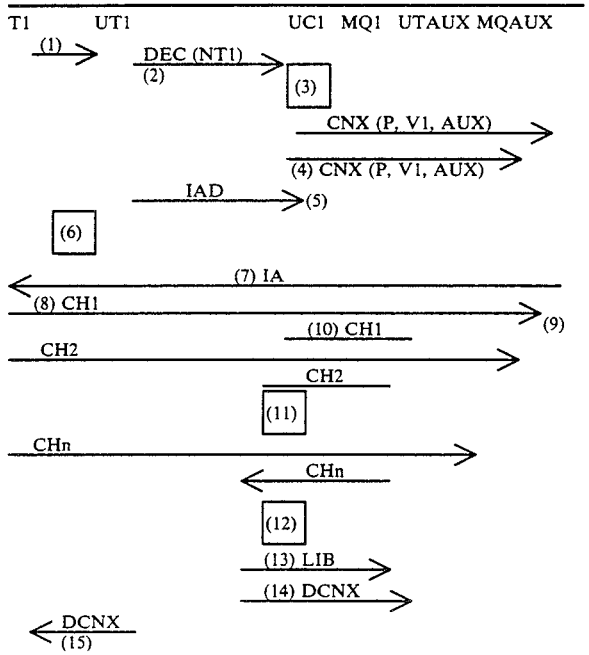

| Legend: | UTAUX | A unit of terminals for receiving dialling in binary code. |
|---|---|---|
| | MQAUX | The marker of the switch which connects the terminal unit UT1 and the unit for receiving dialling UTAUX. |
| (1 to 2) | | Identical with the above. |
| (3) | | The control unit UC1 hunts for a time slot V1 to the terminal unit UT1 and a time slot Vaux to an available dialling receiver. |
| (4) | | Order to the markers MQ1 and MQAUX to set up the connections in both directions between the units UT1 and UTAUX. |
| (5) | | The control unit UC1 warns the terminal unit UT1 that a receiver has been connected. |
| (6 and 7) | | Identical to the previous case (tone is sent by UTAUX). |
| (8) | | The terminal T1 sends the first digit to the dialling receive UTAUX. |
| (9) | | The unit UTAUX interrupts dial tone IA. |
| (10-11-12) | | Identical to the previous case. |
| (13) | | The control unit UC1 sends a release signal to the unit UTAUX. |
| (14) | | The control unit UC1 instructs the marker MQAUX to disconnect the time slot to the dialling receiver UTAUX. |
| (15) | | The control unit UC1 instructs the terminal UT1 to locally disconnect the terminal. |

TABLE 5

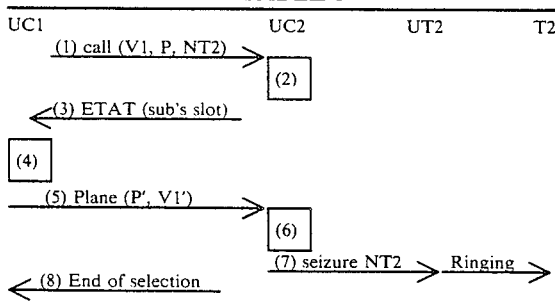

Legend: T2, UT2, UC2 called terminal, called terminal unit, and control unit responsible therefor. NT2 called telephone number.

| (1) | Control unit UC1 calls control unit UC2 indicating the plane RXA of the switching network used by the call, the time slot V1 connected to the caller, and the number of the called terminal (NT2). |
|---|---|
| (2) | The control unit UC2 investigates the state of the called terminal (free, busy, transferred . . . ). If it is free, it hunts for a time slot V2 to connect the terminal T2 to the plane RXA. |
| (3) | Supposing that the terminal T2 is free, but that there is no time slot available to connect it to the plane RXA, eg. because the corresponding PCM link is out of service, the control unit UC2 replies to the control unit UC1. |
| (4) | The control unit UC1 hunts for a time slot V1 to another plane RXB. |
| (5) | The control UC1 informs the control unit UC2 of the plane number and the time slot used. |
| (6) | The control unit UC2 hunts for a new time slot V'2. |
| (7) | Instructions to the unit UC2 to seize the terminal T2 and apply ringing thereto. |
| (8) | A reply to (5): end of selection. |

TABLE 6

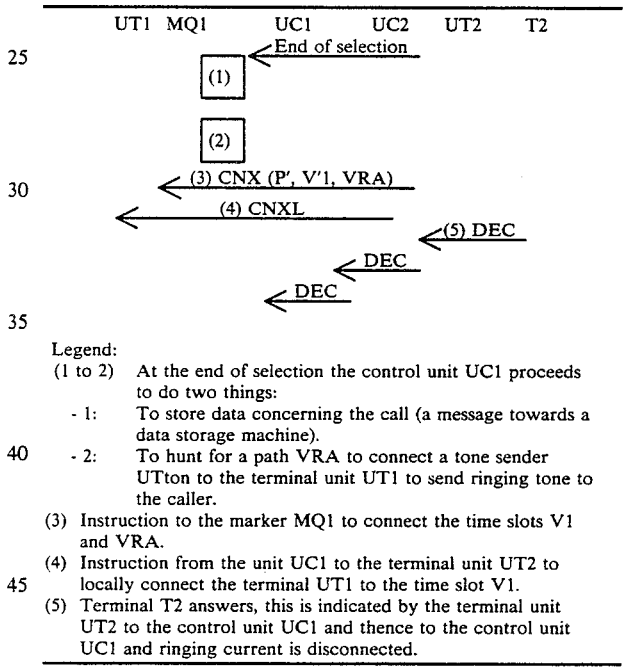

Legend:
| (1 to 2) | At the end of selection the control unit UC1 proceeds to do two things: |
|---|---|
| | - 1: To store data concerning the call (a message towards a data storage machine). |
| | - 2: To hunt for a path VRA to connect a tone sender UTton to the terminal unit UT1 to send ringing tone to the caller. |
| (3) | Instruction to the marker MQ1 to connect the time slots V1 and VRA. |
| (4) | Instruction from the unit UC1 to the terminal unit UT2 to locally connect the terminal UT1 to the time slot V1. |
| (5) | Terminal T2 answers, this is indicated by the terminal unit UT2 to the control unit UC1 and thence to the control unit UC1 and ringing current is disconnected. |

TABLE 7

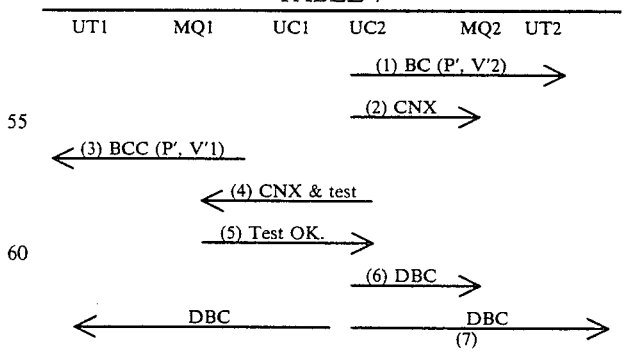

Legend:
| (1) | Instruction (BC) from the control unit UC2 to terminal unit UT2 to loop the circuit FCD of the terminal T2. |
|---|---|
| (2) | Instruction to the marker MQ1 to connect the time |

TABLE 7-continued slot V'2.
(3) Instruction from the control unit UC1 to the terminal unit UT1 to loop the circuit FCD to terminal T1.
(4) Instruction to the marker MQ1 to set up the connection and perform a speech path test.
(5) Report on the test to the control unit UC1.
(6) Instruction to unloop both circuits FCD.
(7) Conversation set up. Call charging begins.

TABLE 8

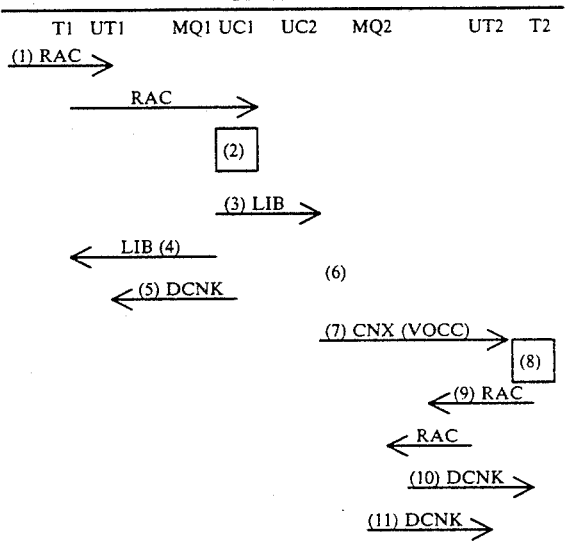

T1  UT1  MQ1 UC1  UC2  MQ2  UT2  T2
(1) RAC →
    RAC →
        (2)
            (3) LIB →
            ← LIB (4)
                    (6)
            ← (5) DCNK
                    (7) CNX (VOCC) →
                                    (8)
                        ← (9) RAC
                        ← RAC
                              (10) DCNK →
                              (11) DCNK →

Legend:
(1) Caller hang up, detected by the terminal unit UT1 in the course of its normal scanning and then indicated to the control unit UC1.
(2) The control unit UC1 sends a charging signal and informs the data storage machine.
(3) The control unit UC1 requests the control unit UC2 to release that part of the switching chain which is under its control.
(4) A release signal is sent to the terminal unit UT1 (local disconnection of a terminal T1).
(5) The marker MQ1 is instructed to break the connection P', V'1, V'2).
(6) The control unit UC2 hunts for a channel VOCC to connect the terminal T2 to a tone generator UTton which sends a busy signal.
(7) Instruction to the marker MQ2 to connect the time slots V'-2 to VOCC.
(8 to 9) The terminal T2 receives bust tone and hangs up.
(10) Instruction to the terminal UT2 to release the terminal T2 (local disconnection).
(11) Instruction to the marker MQ2 to disconnect the link V'2-VOCC.

The way the software is split up into logical machines and into tasks which can communicate between each other by messages, with the destination of the message being recognized by means of an identifier code (logical machine number, task number) independently of the physical location thereof, makes it possible to configure the system initially, and to reconfigure it after a modification or as a result of a breakdown in a control unit.

To do this the physical location of the logical machines is controlled by a supervisor logical machine MLR. To discover the state of the system and to instruct reconfigurations, the machine MLR periodically interrogates all the processors. In each processor there is a maintenance task which performs internal tests and indicates the state of the processor to the machine MLR.

The means and operations brought into play during reconfiguration and system initialization depend on the following choices:

(1) All processors have bootstrap software in ROM as already mentioned when describing the circuits CPU.

(2) The logical machines and the tasks of any processor, as well as the management of its message interchanges are supervised by a monitor program SGTE.

(3) The software is duplicated and stored on two disks which are managed by separate processors for reasons of security.

The initialization sequences for the two processors having the disks, determine, by interchanging timed messages, which of the processors should begin and thereby become the master processor. The initializing sequence for the master processor loads the system monitor program SGTE, a logical machine for handling its files, and a logical machine for controlling the network. The machine MLR interrogates the initialization sequences of the other processors to determine which are present, it constitutes a network card and allocates logical machines to the processors.

Under given conditions (depending on requirements for reliability, availability, frequency of manual interventions . . . ) the described structure may be used to optimize the number of processors used in two different ways:

(1) The processors are interchangeable, thereby enabling a small number of redundant processors, e.g. for n processors UC for call processing, the total number of processors will be $p+q$ where p is the minimum number required to handle the traffic and q is less than p, preferably much less.

Tasks are classified by priority order: in the event of a fault reconfiguration may lead to temporary removal of non-urgent tasks. For example, these tasks may normally be implanted in the redundant processors, thereby futher reducing the amount of equipment needed.

The characteristics of the structure in accordance with the invention for obtaining a high degree of operating security are thus as follows:

(1) The switching network has four independent planes, with a PCM link from each plane to each group (GUT, GUC); the means required for traffic to flow with low or negligible blocking comprise the equipment of two planes. Providing four planes is thus complete duplication of the required means, but the security obtained is much larger since the planes are independent and can cope with multiple faults without manual intervention being required.

(2) The data interchange network is duplicated, with two network controllers operating in load sharing mode, with each of them being capable of passing the entire traffic in the event of failure in the other.

(3) The use of point-to-point type links avoids any one control unit fault disturbing the entire network.

(4) Further, when a module does break down, only the units connected to the module are deprived of access to one of the network links RIT. The remaining units still have access to both of them.

We claim:
1. A time division exchange, comprising:
   a switching network comprising a set of independent planes each driven by at least one respective marker;
   a plurality of processor controlled terminal units;

a plurality of first multiplex links for connecting said terminal units to said switching network;

a set of control units constituted by interchangeable physical processors provided with exchange control software;

a plurality of peripheral equipment driving processors;

a data interchange network for connecting said interchangeable and preipheral equipment processors and said markers, said data interchange network providing serial point-to-point connections using a semaphore procedure;

a network controller for controlling access to said data interchange network; and a plurality of second multiplex links for connecting said interchangeable processors to said switching network, said second multiplex links having time slots used in accordance with a semaphore procedure to control the processors of said terminal units;

wherein said control software is divided into a plurality of logical machines which are independent of the physical processor in which they happen to be loaded at any given time.

2. An exchange according to claim 1, wherein said terminal units are organized in groups of terminal units and wherein said control units are organized in groups of control units, each plane of said switching network comprising a single stage constituted by a square time division matrix comprising switches connected to said terminal units via said first multiplex links, all terminal units in any given terminal unit group being coupled to said switches via a common set of first multiplex links, said switches being connected to said control units via said second multiplex links, all control units in any given control unit group being coupled to said switches via a common set of said second multiplex links.

3. An exchange according to claim 1, wherein said control units each comprise a processor card, a coupler card and a memory card, and a system bus connecting said processor card to said coupler and memory cards, and wherein said processor card comprises a microprocessor having a processor bus which has access both to said system bus and to a resident bus serving resources which are internal to said processor card, said processor bus being connected to a register whose output supplies internal bus addresses and to address lines of said system bus, instructions for selecting and synchronizing the circuits of said processor card being provided by decoders whose inputs are connected firstly to the address bus and secondly to control circuits driven by the control outputs of the microprocessor.

4. An exchange according to claim 3, wherein the control units are interchangeable and each comprise a first coupler for coupling to the links of the data interchange network and a second coupler for coupling to PCM time slots connected to the switching network, the couplers being driven by the microprocessor in "memory space" mode, the first coupler being capable of taking control of the system bus, and the control of the system bus being determined by priority coders and by point-to-point links to the couplers.

5. An exchange according to claim 4 wherein the second coupler comprises an interface for connection to the system bus, memories in which data concerning the management of the PCM time slots and files of messages for sending or for reception are stored, send and receive circuits connected to the PCM time slots for interchanging messages by the semaphore channel procedure; a coupler driver circuit; and multiplexers providing access to the memories via the driver and from the microprocessor.

6. An exchange according to claim 5 wherein the choice of PCM time slots which are active for receiving or for sending, and wherein the operating conditions are loaded into the memories during an initialization phase by the microprocessor, the driver comprising a read only memory addressed by a counter and operating in time sharing mode to control transfers of data between the active PCM time slots, the memories and the driver.

7. An exchange according to claim 2, wherein said switches are driven by control memories and wherein each marker is controlled by a marker processor, each said marker being provided with a coupler for connection to the common data interchange network, said coupler comprising:

a coupler-controlled driver (AU):

a send/receive circuit (HDLC1) for sending and receiving data over said data interchange network under control of said marker processor and under control of said driver;

a control interface comprising a data bus (BD) and first (DEC4) and second (DEC5) decoders for decoding control addresses from said marker processor and for providing control outputs;

an interface providing a connection with said processor, said interface comprising: a bidirectional interface (IN) for coupling said marker processor and data bus; a calling register (RA1) for receiving control information from said marker processor and providing said control information to said data interchange network for obtaining access to said data interchange network; a control register (RC) coupled to said data bus (BD) for receiving and storing instructions for resetting to zero internal registers of said send/receive circuit; a first counter (CB4) for counting clock pulses during sending of data by said send/receive circuit over said data interchange network; a second counter (CB5) for counting clock pulses during reception of data by said send/receive circuit from said data interchange network; an inlet data register (RDE) coupled between said data bus and said send/receive circuit; and an outlet data register (RDS) coupled between said send/receive circuit and said data bus; and send (MEM) and receive (MRE) memories addressable by said first and second counters, respectively, and by said marker processor.

8. An exchange according to claim 1, wherein the said data interchange network comprises duplicate networks driven by duplicate network controllers with alternating priority in order to share the load between them.

9. An exchange according to claim 1, wherein said control software is split up into independent logical machines which are attributed with different priorities, the total number of interchangeable control units (p+q) being very slightly greater than the number of control units p which are strictly required to hold the entire software, the set of logical machines being managed by a control unit processor having a supervisor program and a table indicating where the logical machines are running on physical processors, whereby in the event of a fault, the physical location of the logical machines can be reconfigured over the remaining working control units, and whereby, in the event of saturation, the low priority logical machines may be dispensed with the physical processors loaded with high priority logical machines only, the loading of logical machines and the reconfigurations thereof being controlled by said control unit processor via the data interchange network.

10. An exchange according to claim 2 wherein the control links between the control units and the terminal units are maintained, in the event of a fault:

By changing the PCM link,

By modifying the configuration of a semi-permanent link switch serving to provide links between the control units and the terminal units.

* * * * *